(12) United States Patent
Charisius et al.

(10) Patent No.: US 7,055,131 B2
(45) Date of Patent: May 30, 2006

(54) METHODS AND SYSTEMS FOR ANIMATING THE INTERACTION OF OBJECTS IN AN OBJECT ORIENTED PROGRAM

(75) Inventors: Dietrich Charisius, Stuttgart (DE); Peter Coad, Raleigh, NC (US)

(73) Assignee: Borland Software Corporation, Cupertino, CA (US)

(*) Notice: Subject to any disclaimer, the term of this patent is extended or adjusted under 35 U.S.C. 154(b) by 730 days.

(21) Appl. No.: 09/839,527

(22) Filed: Apr. 20, 2001

(65) Prior Publication Data

US 2002/0112225 A1 Aug. 15, 2002

Related U.S. Application Data

(63) Continuation-in-part of application No. 09/680,063, filed on Oct. 4, 2000.

(60) Provisional application No. 60/199,046, filed on Apr. 21, 2000, provisional application No. 60/157,826, filed on Oct. 5, 1999.

(51) Int. Cl.
*G06F 9/44* (2006.01)

(52) U.S. Cl. ............ 717/109; 717/120; 717/151; 717/168; 345/619; 345/630; 345/632; 345/636

(58) Field of Classification Search ........ 717/106–109, 717/120–133, 140–161, 168; 345/700, 619, 345/630, 632, 363
See application file for complete search history.

(56) References Cited

U.S. PATENT DOCUMENTS

| | | | | |
|---|---|---|---|---|
| 5,410,648 | A * | 4/1995 | Pazel | 717/124 |
| 5,918,053 | A * | 6/1999 | Graham | 717/127 |
| 6,038,393 | A | 3/2000 | Iyengar et al. | |
| 6,292,932 | B1 | 9/2001 | Baisley et al. | |
| 6,327,698 | B1 | 12/2001 | Kolluru | |
| 6,502,239 | B1 * | 12/2002 | Zgarba et al. | 717/168 |

FOREIGN PATENT DOCUMENTS

| | | |
|---|---|---|
| EP | 1 030 242 A2 | 8/2000 |
| EP | 1 030 252 A1 | 8/2000 |

OTHER PUBLICATIONS

James Martin, "Principles of Object-Oriented Analysis and Design," Prentice Hall, Oct. 29, 1992, Chapters 1-22.
M.M. Burnett, et al., "Visual Object-Oriented Programming Concepts and Environments," Manning Publishing, 1994, Chapters 1-12.
Erich Gamma, et al., "Design Patterns Elements of Reusable Object-Oriented Software," Addison-Wesley, 1994, Chapter 1.
Wayne Citrin, et al., "A Formal Definition of Control Semantics in a Completely Visual Language," Sep. 1993, Mac World.
RR Software Inc., "JANUS/ADA 95 Compiler User Manual," Version 5.1 Dec. 1995, pp. 6-1 to 6-48.

(Continued)

*Primary Examiner*—Kakali Chaki
*Assistant Examiner*—Lawrence Shrader
(74) *Attorney, Agent, or Firm*—MacCord Mason PLLC

(57) ABSTRACT

Methods and systems consistent with the present invention provide an improved software development tool that allows a developer to animate the execution of compiled source code as a diagram. The developer may choose to stepwise animate one line of source code at a time. The developer may alternatively indicate at which line of source code the animation should end. In a further embodiment, the software development tool may end the animation when it detects an error.

128 Claims, 30 Drawing Sheets

OTHER PUBLICATIONS

F. Penz, "Visual Programming in the ObjectWorld," Journal of Visual Languages and Computing, Mar. 1991, vol. 2, p. 17-41.

L. Vanhelsuwe, "Mastering JAVABEANS," Sybex, Chapter 2.

David Withey Mcintrye, "A Visual Method for Generating Iconic Programming Environments," UMI Dissertation Services.

Unified Modeling Language (UML) UML BOOCH & OMT Quick Reference for Rational Rose 4.0.

Rational Rose Corporation, Rational Rose Release 4.0 (Nov. 1996) "Using Rational Rose 4.0" Chapters 3-11, pp. 11-207.

UML Distilled Applying the Standard Object Modeling Language 1997 Martin Fowler with Kendall Scott, Chapters 1-11, pp. 1-173.

* cited by examiner

METHODS AND SYSTEMS FOR ANIMATING THE INTERACTION OF OBJECTS IN AN OBJECT ORIENTED PROGRAM

CROSS-REFERENCE TO RELATED APPLICATIONS

This application claims the benefit of the filing date of U.S. Provisional Application No. 60/199,046, entitled "Software Development Tool," filed on Apr. 21, 2000, and is a continuation-in-part of U.S. patent application Ser. No. 09/680,063, entitled "Method and System for Developing Software," filed on Oct. 4, 2000, which claims the benefit of the filing date of U.S. Provisional Application No. 60/157,826, entitled "Visual Unified Modeling Language Development Tool," filed on Oct. 5, 1999, and U.S. Provisional Application No. 60/199,046, entitled "Software Development Tool," filed on Apr. 21, 2000; all of which are incorporated herein by reference.

The following identified U.S. patent applications are also relied upon and are incorporated by reference in this application:

U.S. patent application Ser. No. 09/839,045, entitled "Methods and Systems for Generating Source Code for Object Oriented Elements," and filed on the same date herewith;

U.S. patent application Ser. No. 09/839,526, entitled "Methods and Systems for Relating Data Structures and Object Oriented Elements for Distributed Computing," and filed on the same date herewith;

U.S. patent application Ser. No. 09/839,525, entitled "Methods and Systems for Finding Specific Line Of Source Code," filed on the same date herewith;

U.S. patent application Ser. No. 09/839,645, entitled "Methods and Systems for Finding and Displaying Linked Objects," and filed on the same date herewith;

U.S. patent application Ser. No. 09/839,646, entitled "Methods and Systems for Supporting and Deploying Distributed Computing Components," and filed on the same date herewith;

U.S. patent application Ser. No. 09/838,580, entitled "Diagrammatic Control of a Software in a Version Control System," and filed on the same date herewith;

U.S. patent application Ser. No. 09/838,578, entitled "Navigation Links in Generated Documentation," and filed on the same date herewith;

U.S. patent application Ser. No. 09/839,644, entitled "Methods and Systems for Identifying Dependencies Between Object-Oriented Elements," and filed on the same date herewith; and U.S. patent application Ser. No. 09/839,524, entitled "Methods and Systems for Relating a Data Definition File and a Data Model for Distributed Computing," and filed on the same date herewith.

FIELD OF THE INVENTION

The present invention relates to a method and system for developing software. More particularly, the invention relates to a method and system for animating the execution of compiled code as a diagram.

BACKGROUND OF THE INVENTION

Computer instructions are written in source code. Although a skilled programmer can understand source code to determine what the code is designed to accomplish, with highly complex software systems, a graphical representation or model of the source code is helpful to organize and visualize the structure and components of the system. Using models, the complex systems are easily identified, and the structural and behavioral patterns can be visualized and documented.

The well-known Unified Modeling Language (UML) is a general-purpose notational language for visualizing, specifying, constructing, and documenting complex software systems. UML is used to model systems ranging from business information systems to Web-based distributed systems, to real-time embedded systems. UML formalizes the notion that real-world objects are best modeled as self-contained entities that contain both data and functionality. UML is more clearly described in the following references, which are incorporated herein by reference: (1) Martin Fowler, *UML Distilled Second Edition: Applying the Standard Object Modeling Language*, Addison-Wesley (1999); (2) Booch, Rumbaugh, and Jacobson, *The Unified Modeling Language User Guide*, Addison-Wesley (1998); (3) Peter Coad, Jeff DeLuca, and Eric Lefebvre, *Java Modeling in Color with UML: Enterprise Components and Process*, Prentice Hall (1999); and (4) Peter Coad, Mark Mayfield, and Jonathan Kern, *Java Design: Building Better Apps & Applets* (2nd Ed.), Prentice Hall (1998).

As shown in FIG. 1, conventional software development tools 100 allow a programmer to view UML 102 while viewing source code 104. The source code 104 is stored in a file, and a reverse engineering module 106 converts the source code 104 into a representation of the software project in a database or repository 108. The software project comprises source code 104 in at least one file which, when compiled, forms a sequence of instructions to be run by the data processing system. The repository 108 generates the UML 102. If any changes are made to the UML 102, they are automatically reflected in the repository 108, and a code generator 110 converts the representation in the repository 108 into source code 104. Such software development tools 100, however, do not synchronize the displays of the UML 102 and the source code 104. Rather, the repository 108 stores the representation of the software project while the file stores the source code 104. A modification in the UML 102 does not appear in the source code 104 unless the code generator 110 re-generates the source code 104 from the data in the repository 108. When this occurs, the entire source code 104 is rewritten. Similarly, any modifications made to the source code 104 do not appear in the UML 102 unless the reverse engineering module 106 updates the repository 108. As a result, redundant information is stored in the repository 108 and the source code 104. In addition, rather than making incremental changes to the source code 104, conventional software development tools 100 rewrite the overall source code 104 when modifications are made to the UML 102, resulting in wasted processing time. This type of manual, large-grained synchronization requires either human intervention, or a "batch" style process to try to keep the two views (the UML 102 and the source code 104) in sync. Unfortunately, this approach, adopted by many tools, leads to many undesirable side-effects; such as desired changes to the source code being overwritten by the tool. A further disadvantage with conventional software development tools 100 is that they are designed to only work in a single programming language. Thus, a tool 100 that is designed for Java™ programs cannot be utilized to develop a program in C++. There is a need in the art for a tool that avoids the limitations of these conventional software development tools.

SUMMARY OF THE INVENTION

Methods and systems consistent with the present invention provide an improved software development tool that overcomes the limitations of conventional software development tools. The improved software development tool of the present invention allows a developer to simultaneously view a graphical and a textual display of source code. The graphical and textual views are synchronized so that a modification in one view is automatically reflected in the other view. In addition, the software development tool is designed for use with more than one programming language.

Contrary to a conventional debugger, that provides a textual display of the executed lines of code, methods and systems consistent with the present invention animate the graphical representation of the source code as the software development tool steps through the code. The animation may proceed through the entire source code without interruption. Alternatively, the animation may continue until the software development tool prompts the animation to end. For example, the software development tool may proceed through each line of source code until the next line causes an object or a link to be displayed in a visually distinctive manner, e.g., the object or link may be highlighted, the color of the object or link may change, the font of the text within the object may change, or the thickness of the link may change. In another embodiment, the developer may indicate at which line the animation should end. In yet another embodiment, the software development tool compiles and debugs the line of code, and the animation proceeds until the software development tool detects an error in the source code.

In accordance with methods consistent with the present invention, a method is provided in a data processing system. The data processing system comprises source code, and the source code comprises a plurality of lines. The method comprises the steps of displaying a graphical representation of the source code, wherein the graphical representation has portions that correspond to the lines, initiating an automated process that processes each of the lines, and while the automated process processes each of the lines, displaying the portion of the graphical representation that corresponds to the line in a visually distinctive manner such that it visually appears that progression of the automated process is animated.

In accordance with methods consistent with the present invention, a method is provided in a data processing system. The data processing system comprises source code, and the source code comprises a plurality of lines. The method comprises the steps of displaying a graphical representation of the source code, wherein the graphical representation has portions that correspond to the lines, and for each of the lines, displaying the portion of the graphical representation that corresponds to the line in a visually distinctive manner such that it appears that progression through the code is animated.

In accordance with methods consistent with the present invention, a method is provided in a data processing system. The data processing system comprises source code, and the source code comprises a plurality of lines. The method comprises the steps of displaying a graphical representation of the plurality of lines such that at least one of the lines is not represented in the graphical representation, initiating an automated process on each of the lines of the source code, receiving an indication to suspend the automated process when the automated process encounters one of the lines that is represented in the graphical representation, and while the automated process is being performed on each of the lines of source code, determining whether the line is represented in the graphical representation, and when it is determined that the line is represented in the graphical representation, suspending the automated process.

In accordance with methods consistent with the present invention, a method is provided in a data processing system. The data processing system comprises source code, and the source code comprises a plurality of lines. The method comprises the steps of displaying a graphical representation of the source code, initiating an automated process to be performed on each of the lines of the source code, receiving an indication to suspend the automated process when the automated process encounters a selected one of the lines, and while the automated process is being performed on each of the lines of source code, determining whether the line is the selected line, and when it is determined that the line is the selected line, suspending the automated process.

In accordance with methods consistent with the present invention, a method is provided in a data processing system. The data processing system comprises source code, and the source code comprises a plurality of lines. The method comprises the steps of displaying a graphical representation of the source code, receiving an indication of a first of the plurality of lines of the source code, selecting a second of the plurality of lines of the source code, determining whether the second line is the same as the first line, and when it is determined that the second line is not the same as the first line, displaying the graphical representation of the second line in a visually distinctive manner.

In accordance with methods consistent with the present invention, a method is provided in a data processing system. The data processing system comprises source code, and the source code comprises a plurality of lines. The method comprises the steps of displaying a graphical representation of the plurality of lines such that at least one of the lines is not represented in the graphical representation, initiating an automated process on each of the lines of the source code, while the automated process is being performed on each of the lines of source code, compiling the line, determining whether the compiled line produces an error, and when it is determined that the compiled line produces the error, suspending the automated process.

In accordance with methods consistent with the present invention, a method is provided in a data processing system. The data processing system comprises source code, and the source code comprises a plurality of lines. The method comprises the steps of displaying a graphical representation of the source code, selecting one of the plurality of lines of the source code, compiling the selected line, determining whether the compiled line produces an error, and when it is determined that the compiled line does not produce an error, displaying the graphical representation of the selected line in a visually distinctive manner.

In accordance with articles of manufacture consistent with the present invention, a computer-readable medium is provided. The computer-readable medium contains instructions for controlling a data processing system to perform a method. The data processing system comprises source code, and the source code comprises a plurality of lines. The method comprises the steps of displaying a graphical representation of the source code, wherein the graphical representation has portions that correspond to the lines, initiating an automated process that processes each of the lines, and while the automated process processes each of the lines, displaying the portion of the graphical representation that corresponds to the line in a visually distinctive manner such that it visually appears that progression of the automated process is animated.

In accordance with articles of manufacture consistent with the present invention, a computer-readable medium is provided. The computer-readable medium contains instructions for controlling a data processing system to perform a method. The data processing system comprises source code, and the source code comprises a plurality of lines. The method comprises the steps of displaying a graphical representation of the source code, wherein the graphical representation has portions that correspond to the lines, and for each of the lines, displaying the portion of the graphical representation that corresponds to the line in a visually distinctive manner such that it appears that progression through the code is animated.

In accordance with articles of manufacture consistent with the present invention, a computer-readable medium is provided. The computer-readable medium contains instructions for controlling a data processing system to perform a method. The data processing system comprises source code, and the source code comprises a plurality of lines. The method comprises the steps of displaying a graphical representation of the plurality of lines such that at least one of the lines is not represented in the graphical representation, initiating an automated process on each of the lines of the source code, receiving an indication to suspend the automated process when the automated process encounters one of the lines that is represented in the graphical representation, and while the automated process is being performed on each of the lines of source code, determining whether the line is represented in the graphical representation, and when it is determined that the line is represented in the graphical representation, suspending the automated process.

In accordance with articles of manufacture consistent with the present invention, a computer-readable medium is provided. The computer-readable medium contains instructions for controlling a data processing system to perform a method. The data processing system comprises source code, and the source code comprises a plurality of lines. The method comprises the steps of displaying a graphical representation of the source code, initiating an automated process to be performed on each of the lines of the source code, receiving an indication to suspend the automated process when the automated process encounters a selected one of the lines, and while the automated process is being performed on each of the lines of source code, determining whether the line is the selected line, and when it is determined that the line is the selected line, suspending the automated process.

In accordance with articles of manufacture consistent with the present invention, a computer-readable medium is provided. The computer-readable medium contains instructions for controlling a data processing system to perform a method. The data processing system comprises source code, and the source code comprises a plurality of lines. The method comprises the steps of displaying a graphical representation of the source code, receiving an indication of a first of the plurality of lines of the source code, selecting a second of the plurality of lines of the source code, determining whether the second line is the same as the first line, and when it is determined that the second line is not the same as the first line, displaying the graphical representation of the second line in a visually distinctive manner.

In accordance with articles of manufacture consistent with the present invention, a computer-readable medium is provided. The computer-readable medium contains instructions for controlling a data processing system to perform a method. The data processing system comprises source code, and the source code comprises a plurality of lines. The method comprises the steps of displaying a graphical representation of the plurality of lines such that at least one of the lines is not represented in the graphical representation, initiating an automated process on each of the lines of the source code, while the automated process is being performed on each of the lines of source code, compiling the line, determining whether the compiled line produces an error, and when it is determined that the compiled line produces the error, suspending the automated process.

In accordance with articles of manufacture consistent with the present invention, a computer-readable medium is provided. The computer-readable medium contains instructions for controlling a data processing system to perform a method. The data processing system comprises source code, and the source code comprises a plurality of lines. The method comprises the steps of displaying a graphical representation of the source code, selecting one of the plurality of lines of the source code, compiling the selected line, determining whether the compiled line produces an error, and when it is determined that the compiled line does not produce an error, displaying the graphical representation of the selected line in a visually distinctive manner.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Methods and systems consistent with the present invention provide an improved software development tool that creates a graphical representation of source code regardless of the programming language in which the code is written. In addition, the software development tool simultaneously reflects any modifications to the source code to both the display of the graphical representation as well as the textual display of the source code.

Figure 1:
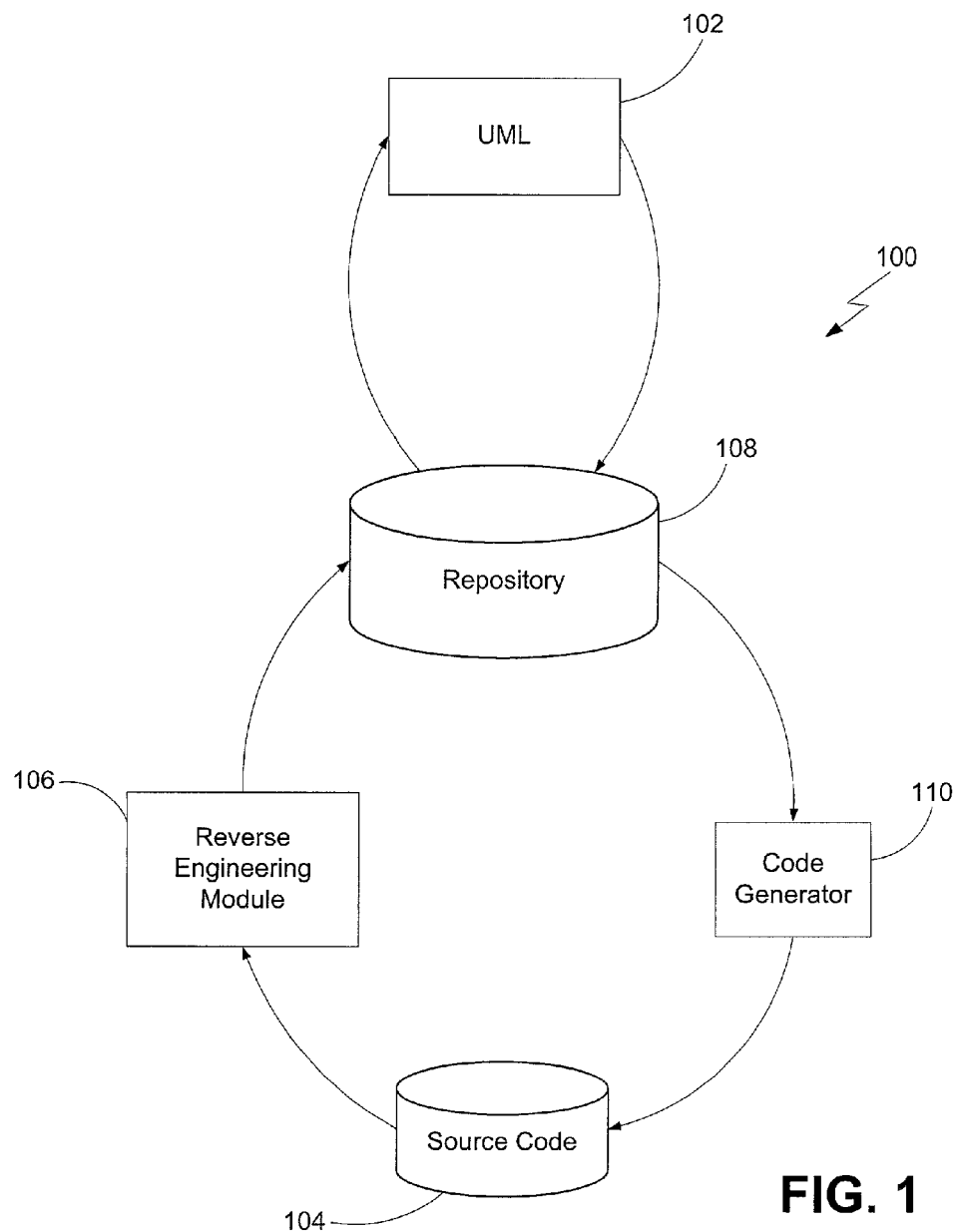
FIG. 1 depicts a conventional software development tool.
Figure 2:
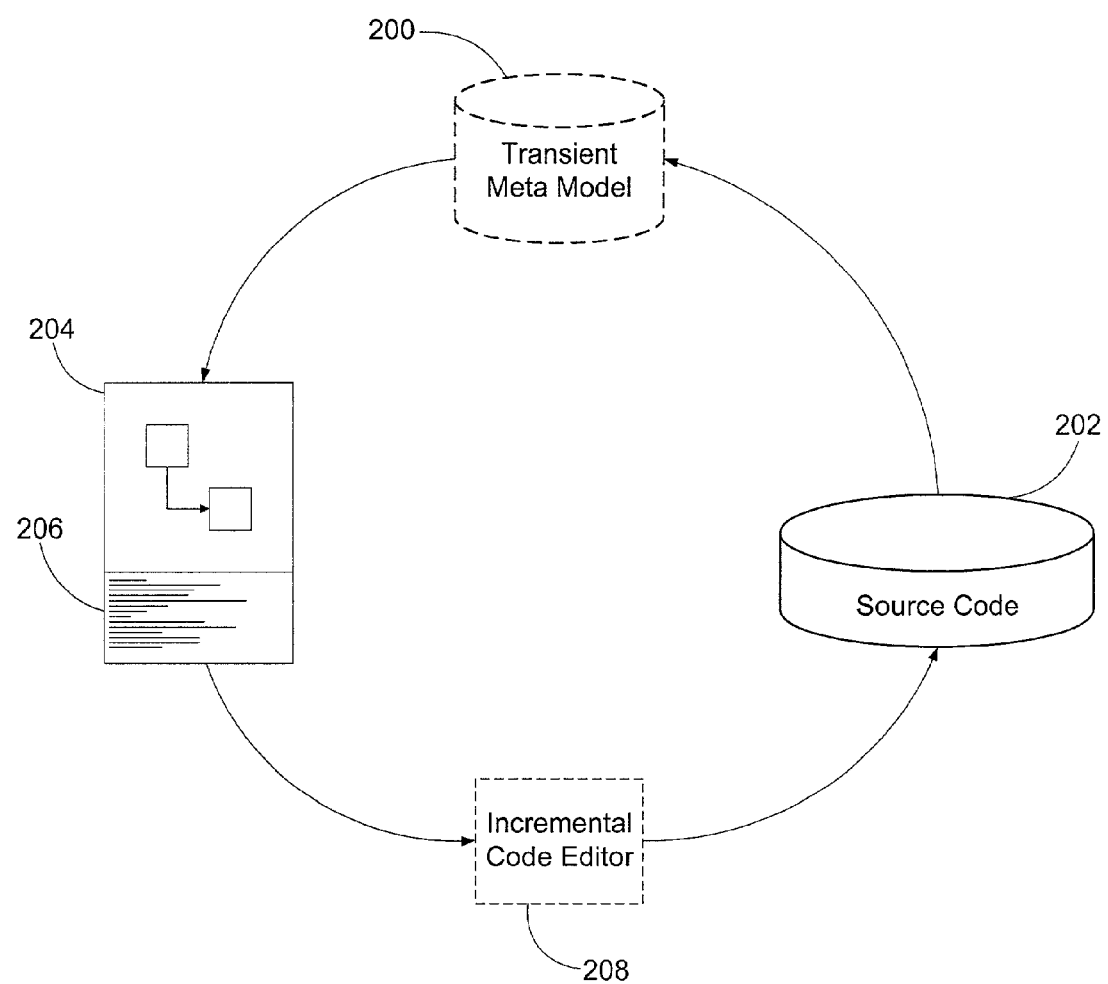
FIG. 2 depicts an overview of a software development tool in accordance with methods and systems consistent with the present invention.

As depicted in FIG. 2, source code 202 is being displayed in both a graphical form 204 and a textual form 206. In accordance with methods and systems consistent with the present invention, the improved software development tool generates a transient meta model (TMM) 200 which stores a language-neutral representation of the source code 202. The graphical 204 and textual 206 representations of the source code 202 are generated from the language-neutral representation in the TMM 200. Although modifications made on the displays 204 and 206 may appear to modify the displays 204 and 206, in actuality all modifications are made directly to the source code 202 via an incremental code editor (ICE) 208, and the TMM 200 is used to generate the modifications in both the graphical 204 and the textual 206 views from the modifications to the source code 202.

The improved software development tool provides simultaneous round-trip engineering, i.e., the graphical representation 204 is synchronized with the textual representation 206. Thus, if a change is made to the source code 202 via the graphical representation 204, the textual representation 206 is updated automatically. Similarly, if a change is made to the source code 202 via the textual representation 206, the graphical representation 204 is updated to remain synchronized. There is no repository, no batch code generation, and no risk of losing code.

Figure 3:
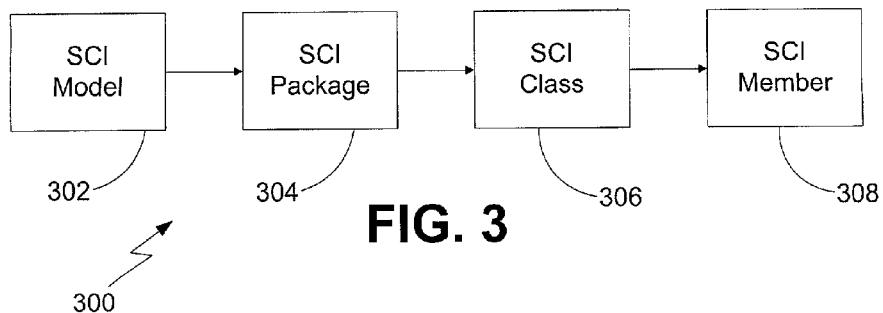
FIG. 3 depicts a data structure of the language-neutral representation created by the software development tool of FIG. 2.

The data structure 300 of the language-neutral representation is depicted in FIG. 3. The data structure 300 comprises a Source Code Interface (SCI) model 302, an SCI package 304, an SCI class 306, and an SCI member 308. The SCI model 302 is the source code organized into packages. The SCI model 302 corresponds to a directory for a software project being developed by the user, and the SCI package 304 corresponds to a subdirectory. The software project comprises the source code in at least one file that is compiled to form a sequence of instructions to be run by a data processing system. The data processing system is discussed in detail below. As is well known in object-oriented programming, the class 306 is a category of objects which describes a group of objects with similar properties (attributes), common behavior (operations or methods), common relationships to other objects, and common semantics. The members 308 comprise attributes and/or operations.

Figure 4:
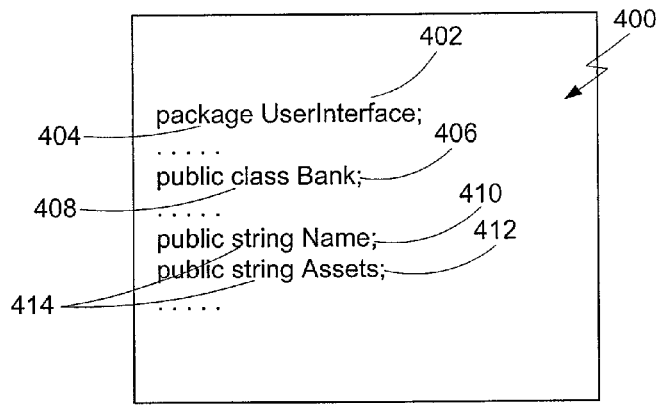
FIG. 4 depicts representative source code.
Figure 5:
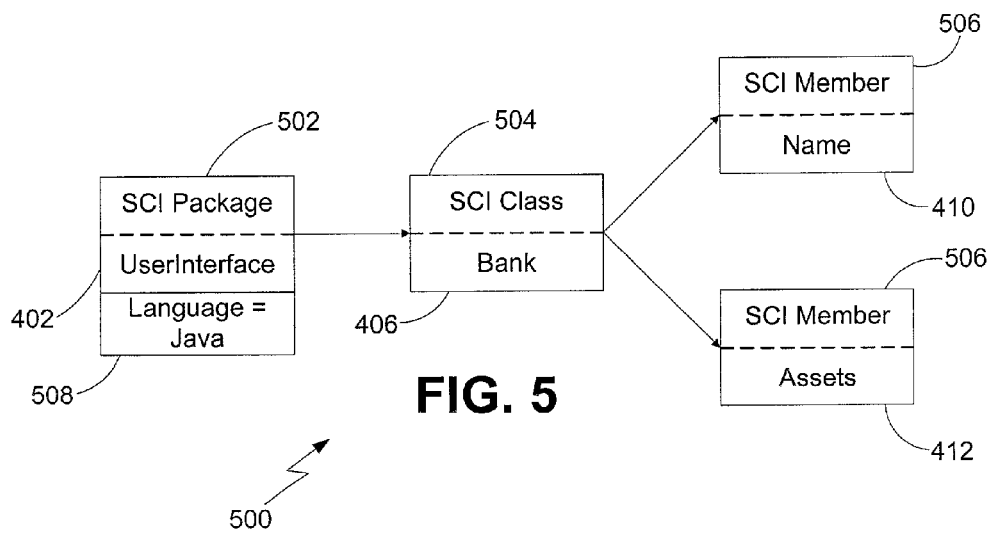
FIG. 5 depicts the data structure of the language-neutral representation of the source code of FIG. 4.

For example, the data structure 500 for the source code 400 depicted in FIG. 4 is depicted in FIG. 5. UserInterface 402 is defined as a package 404. Accordingly, UserInterface 402 is contained in SCI package 502. Similarly, Bank 406, which is defined as a class 408, is contained in SCI class 504, and Name 410 and Assets 412, which are defined as attributes (strings 414), are contained in SCI members 506. Since these elements are in the same project, all are linked. The data structure 500 also identifies the language in which the source code is written 508, e.g., the Java™ language.

Figure 6:
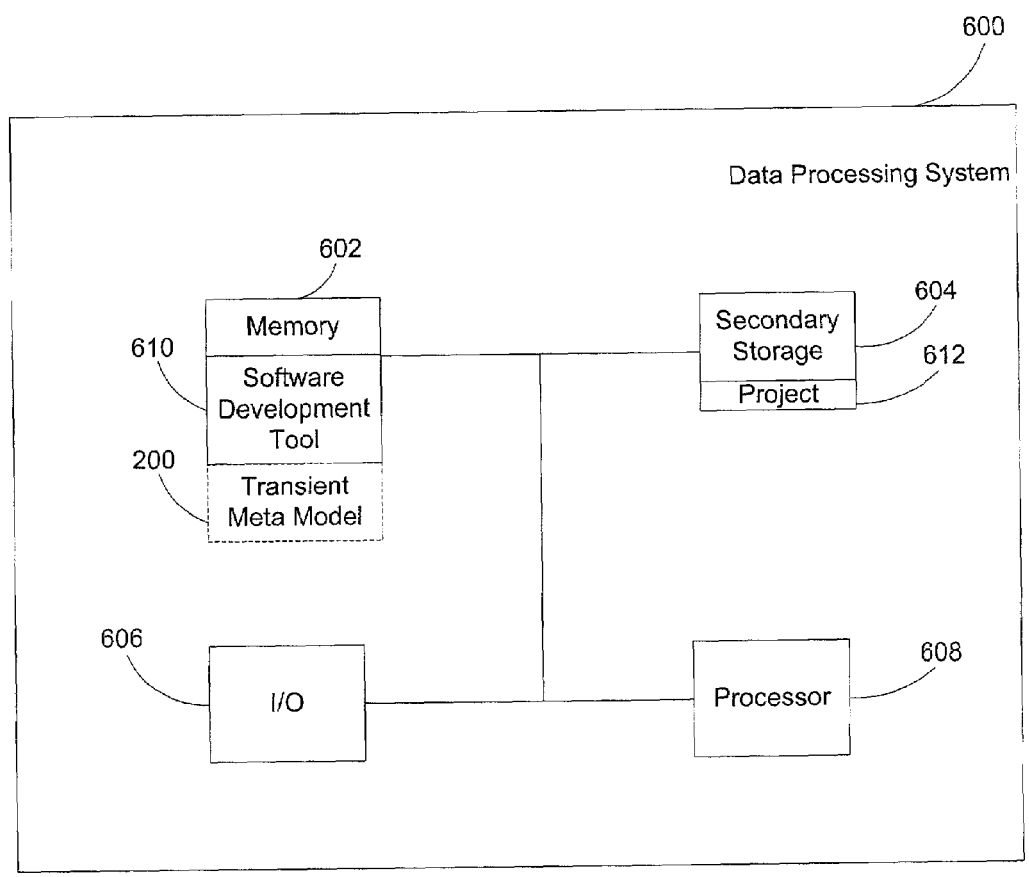
FIG. 6 depicts a data processing system suitable for practicing the present invention.

FIG. 6 depicts a data processing system 600 suitable for practicing methods and systems consistent with the present invention. Data processing system 600 comprises a memory 602, a secondary storage device 604, an I/O device 606, and a processor 608. Memory 602 includes the improved software development tool 610. The software development tool 610 is used to develop a software project 612, and create the TMM 200 in the memory 602. The project 612 is stored in the secondary storage device 604 of the data processing system 600. One skilled in the art will recognize that data processing system 600 may contain additional or different components.

Although aspects of the present invention are described as being stored in memory, one skilled in the art will appreciate that these aspects can also be stored on or read from other types of computer-readable media, such as secondary storage devices, like hard disks, floppy disks or CD-ROM; a carrier wave from a network, such as Internet; or other forms of RAM or ROM either currently known or later developed.

Figure 7:
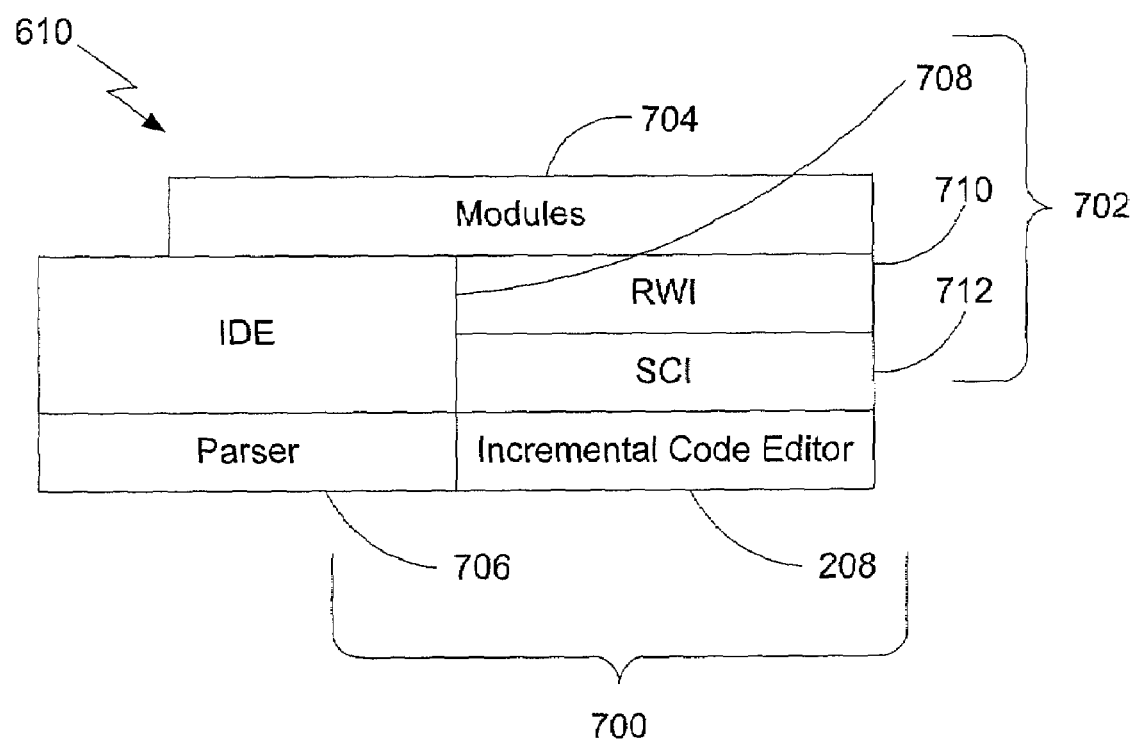
FIG. 7 depicts an architectural overview of the software development tool of FIG. 2.

FIG. 7 illustrates an architectural overview of the improved software development tool 610. The tool 610 comprises a core 700, an open application program interface (API) 702, and modules 704. The core 700 includes a parser 706 and an ICE 208. The parser 706 converts the source code into the language-neutral representation in the TMM, and the ICE 208 converts the text from the displays into source code. There are three main packages composing the API 702: Integrated Development Environment (IDE) 708; Read-Write Interface (RWI) 710; and Source Code Interface (SCI) 712. Each package includes corresponding subpackages. As is well known in the art, a package is a collection of attributes, notifications, operations, or behaviors that are treated as a single module or program unit.

IDE 708 is the API 702 needed to generate custom outputs based on information contained in a model. It is a read-only interface, i.e., the user can extract information from the model, but not change the model. IDE 708 provides the functionality related to the model's representation in IDE 708 and interaction with the user. Each package composing the IDE group has a description highlighting the areas of applicability of this concrete package.

RWI 710 enables the user to go deeper into the architecture. Using RWI 710, information can be extracted from and written to the models. RWI not only represents packages, classes and members, but it may also represent different diagrams (class diagrams, use case diagrams, sequence diagrams and others), links, notes, use cases, actors, states, etc.

SCI 712 is at the source code level, and allows the user to work with the source code almost independently of the language being used.

There are a variety of modules 704 in the software development tool 610 of the present invention. Some of the modules 704 access information to generate graphical and code documentation in custom formats, export to different file formats, or develop patterns. The software development tool also includes a quality assurance (QA) module which monitors the modifications to the source code and calculates the complexity metrics, i.e., the measurement of the program's performance or efficiency, to support quality assurance. The types of metrics calculated by the software development tool include basic metrics, cohesion metrics, complexity metrics, coupling metrics, Halstead metrics, inheritance metrics, maximum metrics, polymorphism metrics, and ratio metrics. Examples of these metrics with their respective definitions are identified in Tables 1–9 below.

TABLE 1

Basic Metrics

| Basic Metrics | Description |
| --- | --- |
| Lines Of Code | Counts the number of code lines. |
| Number Of Attributes | Counts the number of attributes. If a class has a high number of attributes, it may be appropriate to divide it into subclasses. |
| Number Of Classes | Counts the number of classes. |
| Number Of Import Statement | Counts the number of imported packages/classes. This measure can highlight excessive importing, and also can be used as a measure of coupling. |
| Number Of Members | Counts the number of members, i.e., attributes and operations. If a class has a high number of members, it may be appropriate to divide it into subclasses. |
| Number Of Operations | Counts the number of operations. If a class has a high number of operations, it may be appropriate to divide it into subclasses. |

TABLE 2

Cohesion Metrics

| Cohesion Metrics | Description |
| --- | --- |
| Lack Of Cohesion Of Methods 1 | Takes each pair of methods in the class and determines the set of fields they each access. A low value indicates high coupling between methods, which indicates potentially low reusability and increased testing because many methods can affect the same attributes. |
| Lack Of Cohesion Of Methods 2 | Counts the percentage of methods that do not access a specific attribute averaged over all attributes in the class. A high value of cohesion (a low lack of cohesion) implies that the class is well designed. |
| Lack Of Cohesion Of Methods 3 | Measures the dissimilarity of methods in a class by attributes. A low value indicates good class subdivision, implying simplicity and high reusability. A high lack of cohesion increases complexity, thereby increasing the likelihood of errors during the development process. |

TABLE 3

Complexity Metrics

| Complexity Metrics | Description |
| --- | --- |
| Attribute Complexity | Defined as the sum of each attribute's value in the class. |
| Cyclomatic Complexity | Represents the cognitive complexity of the class. It counts the number of possible paths through an algorithm by counting the number of distinct regions on a flowgraph, i.e., the number of 'if,' 'for' and 'while' statements in the operation's body. |
| Number Of Remote Methods | Processes all of the methods and constructors, and counts the number of different remote methods called. A remote method is defined as a method which is not declared in either the class itself or its ancestors. |
| Response For Class | Calculated as 'Number of Local Methods' + 'Number of Remote Methods.' A class which provides a larger response set is considered to be more complex and requires more testing than one with a smaller overall design complexity. |
| Weighted Methods Per Class 1 | The sum of the complexity of all methods for a class, where each method is weighted by its cyclomatic complexity. The number of methods and the complexity of the methods involved is a predictor of how much time and effort is required to develop and maintain the class. |

TABLE 3-continued

Complexity Metrics

| Complexity Metrics | Description |
|---|---|
| Weighted Methods Per Class 2 | Measures the complexity of a class, assuming that a class with more methods than another is more complex, and that a method with more parameters than another is also likely to be more complex. |

TABLE 4

Coupling Metrics

| Coupling Metrics | Description |
|---|---|
| Coupling Between Objects | Represents the number of other classes to which a class is coupled. Counts the number of reference types that are used in attribute declarations, formal parameters, return types, throws declarations and local variables, and types from which attribute and method selections are made. Excessive coupling between objects is detrimental to modular design and prevents reuse. The more independent a class is, the easier it is to reuse it in another application. In order to improve modularity and promote encapsulation, inter-object class couples should be kept to a minimum. The larger the number of couples, the higher the sensitivity to changes in other parts of the design, and therefore maintenance is more difficult. A measure of coupling is useful to determine how complex the testing of various parts of a design is likely to be. The higher the inter-object class coupling, the more rigorous the testing needs to be. |
| Data Abstraction Coupling | Counts the number of reference types used in the attribute declarations. |
| FanOut | Counts the number of reference types that are used in attribute declarations, formal parameters, return types, throws declarations and local variables. |

TABLE 5

Halstead Metrics

| Halstead Metrics | Description |
|---|---|
| Halstead Difficulty | This measure is one of the Halstead Software Science metrics. It is calculated as ('Number of Unique Operator'/'Number of Unique Operands') * ('Number of Operands'/'Number of Unique Operands'). |
| Halstead Effort | This measure is one of the Halstead Software Science metrics. It is calculated as 'Halstead Difficulty' * 'Halstead Program Volume.' |
| Halstead Program Length | This measure is one of the Halstead Software Science metrics. It is calculated as 'Number of Operators' + 'Number of Operands.' |
| Halstead Program Vocabulary | This measure is one of the Halstead Software Science metrics. It is calculated as 'Number of Unique Operators' + 'Number of Unique Operands.' |
| Halstead Program Volume | This measure is one of the Halstead Software Science metrics. It is calculated as 'Halstead Program Length' * Log2('Halstead Program Vocabulary'). |
| Number Of Operands | This measure is used as an input to the Halstead Software Science metrics. It counts the number of operands used in a class. |
| Number Of Operators | This measure is used as an input to the Halstead Software Science metrics. It counts the number of operators used in a class. |

TABLE 5-continued

Halstead Metrics

| Halstead Metrics | Description |
|---|---|
| Number Of Unique Operands | This measure is used as an input to the Halstead Software Science metrics. It counts the number of unique operands used in a class. |
| Number Of Unique Operators | This measure is used as an input to the Halstead Software Science metrics. It counts the number of unique operators used in a class. |

TABLE 6

Inheritance Metrics

| Inheritance Metrics | Description |
|---|---|
| Depth Of Inheritance Hierarchy | Counts how far down the inheritance hierarchy a class or interface is declared. High values imply that a class is quite specialized. |
| Number Of Child Classes | Counts the number of classes which inherit from a particular class, i.e., the number of classes in the inheritance tree down from a class. Non-zero value indicates that the particular class is being re-used. The abstraction of the class may be poor if there are too many child classes. It should also be stated that a high value of this measure points to the definite amount of testing required for each child class. |

TABLE 7

Maximum Metrics

| Maximum Metrics | Description |
|---|---|
| Maximum Number Of Levels | Counts the maximum depth of 'if,' 'for' and 'while' branches in the bodies of methods. Logical units with a large number of nested levels may need implementation simplification and process improvement because groups that contain more than seven pieces of information are increasingly harder for people to understand in problem solving. |
| Maximum Number Of Parameters | Displays the maximum number of parameters among all class operations. Methods with many parameters tend to be more specialized and, thus, are less likely to be reusable. |
| Maximum Size Of Operation | Counts the maximum size of the operations for a class. Method size is determined in terms of cyclomatic complexity, i.e., the number of 'if,' 'for' and 'while' statements in the operation's body. |

TABLE 8

Polymorphism Metrics

| Polymorphism Metrics | Description |
|---|---|
| Number Of Added Methods | Counts the number of operations added by a class. A large value of this measure indicates that the functionality of the given class becomes increasingly distinct from that of the parent classes. In this case, it should be considered whether this class genuinely should be inheriting from the parent, or if it could be broken down into several smaller classes. |

TABLE 8-continued

Polymorphism Metrics

| Polymorphism Metrics | Description |
|---|---|
| Number Of Overridden Methods | Counts the number of inherited operations which a class overrides. Classes without parents are not processed. High values tend to indicate design problems, i.e., subclasses should generally add to and extend the functionality of the parent classes rather than overriding them. |

TABLE 9

Ratio Metrics

| Ratio Metrics | Description |
|---|---|
| Comment Ratio | Counts the ratio of comments to total lines of code including comments. |
| Percentage Of Package Members | Counts the percentage of package members in a class. |
| Percentage Of Private Members | Counts the percentage of private members in a class. |
| Percentage Of Protected Members | Counts the percentage of protected members in a class. |
| Percentage Of Public Members | Counts the proportion of vulnerable members in a class. A large proportion of such members means that the class has high potential to be affected by external classes and means that increased efforts will be needed to test such a class thoroughly. |
| True Comment Ratio | Counts the ratio of comments to total lines of code excluding comments. |

The QA module also provides audits, i.e., the module checks for conformance to predefined or user-defined styles. The types of audits provided by the module include coding style, critical errors, declaration style, documentation, naming style, performance, possible errors and superfluous content. Examples of these audits with their respective definitions are identified in Tables 10–17 below.

TABLE 10

Coding Style Audits

| Coding Style Audits | Description |
|---|---|
| Access Of Static Members Through Objects | Static members should be referenced through class names rather than through objects. |
| Assignment To Formal Parameters | Formal parameters should not be assigned. |
| Complex Assignment | Checks for the occurrence of multiple assignments and assignments to variables within the same expression. Complex assignments should be avoided since they decrease program readability. |
| Don't Use the Negation Operator Frequently | The negation operator slows down the readability of the program. Thus, it is recommended that it not be used frequently. |
| Operator '?:' May Not Be Used | The operator '?:' makes the code harder to read than the alternative form with an if-statement. |
| Provide Incremental In For-Statement or use while-statement | Checks if the third argument of the 'for'-statement is missing. |
| Replacement For Demand Imports | Demand import-declarations must be replaced by a list of single import-declarations that are actually imported into the compilation unit. In other words, import-statements may not end with an asterisk. |

TABLE 10-continued

Coding Style Audits

| Coding Style Audits | Description |
|---|---|
| Use Abbreviated Assignment Operator | Use the abbreviated assignment operator in order to write programs more rapidly. Also some compilers run faster with the abbreviated assignment operator. |
| Use 'this' Explicitly To Access Class Members | Tries to make the developer use 'this' explicitly when trying to access class members. Using the same class member names with parameter names often makes what the developer is referring to unclear. |

TABLE 11

Critical Errors Audits

| Critical Errors Audits | Description |
|---|---|
| Avoid Hiding Inherited Attributes | Detects when attributes declared in child classes hide inherited attributes. |
| Avoid Hiding Inherited Static Methods | Detects when inherited static operations are hidden by child classes. |
| Command Query Separation | Prevents methods that return a value from a modifying state. The methods used to query the state of an object must be different from the methods used to perform commands (change the state of the object). |
| Hiding Of Names | Declarations of names should not hide other declarations of the same name. |
| Inaccessible Constructor Or Method Matches | Overload resolution only considers constructors and methods that are visible at the point of the call. If, however, all the constructors and methods were considered, there may be more matches. This rule is violated in this case. Imagine that ClassB is in a different package than ClassA. Then the allocation of ClassB violates this rule since the second constructor is not visible at the point of the allocation, but it still matches the allocation (based on signature). Also the call to open in ClassB violates this rule since the second and the third declarations of open are not visible at the point of the call, but it still matches the call (based on signature). |
| Multiple Visible Declarations With Same Name | Multiple declarations with the same name must not be simultaneously visible except for over-loaded methods. |
| Overriding a Non-Abstract Method With an Abstract Method | Checks for abstract methods overriding non-abstract methods in a subclass. |
| Overriding a Private Method | A subclass should not contain a method with the same name and signature as in a superclass if these methods are declared to be private. |
| Overloading Within a Subclass | A superclass method may not be overloaded within a subclass unless all overloading in the superclass are also overridden in the subclass. It is very unusual for a subclass to be overloading methods in its superclass without also overriding the methods it is overloading. More frequently this happens due to inconsistent changes between the superclass and subclass—i.e., the intention of the user is to override the method in the superclass, but due to the error, the subclass method ends up overloading the superclass method. |
| Use of Static Attribute for Initialization | Non-final static attributes should not be used in initializations of attributes. |

TABLE 12

Declaration Style Audits

| Declaration Style Audits | Description |
|---|---|
| Badly Located Array Declarators | Array declarators must be placed next to the type descriptor of their component type. |
| Constant Private Attributes Must Be Final | Private attributes that never get their values changed must be declared final. By explicitly declaring them in such a way, a reader of the source code get some information of how the attribute is supposed to be used. |
| Constant Variables Must Be Final | Local variables that never get their values changed must be declared final. By explicitly declaring them in such a way, a reader of the source code obtains information about how the variable is supposed to be used. |
| Declare Variables In One Statement Each | Several variables (attributes and local variables) should not be declared in the same statement. |
| Instantiated Classes Should Be Final | This rule recommends making all instantiated classes final. It checks classes which are present in the object model. Classes from search/classpath are ignored. |
| List All Public And Package Members First | Enforces a standard to improve readability. Methods/data in your class should be ordered properly. |
| Order Of Appearance Of Modifiers | Checks for correct ordering of modifiers. For classes, this includes visibility (public, protected or private), abstract, static, final. For attributes, this includes visibility (public, protected or private), static, final, transient, volatile. For operations, this includes visibility (public, protected or private), abstract, static, final, synchronized, native. |
| Put the Main Function Last | Tries to make the program comply with various coding standards regarding the form of the class definitions. |

TABLE 13

Documentation Audits

| Documentation Audits | Description |
|---|---|
| Bad Tag In JavaDoc Comments | This rule verifies code against accidental use of improper JavaDoc tags. |
| Distinguish Between JavaDoc And Ordinary Comments | Checks whether the JavaDoc comments in your program ends with '**/' and ordinary C-style ones with '*/.' |

TABLE 14

Naming Style Audits

| Naming Style Audits | Description |
|---|---|
| Class Name Must Match Its File Name | Checks whether top level classes or interfaces have the same name as the file in which they reside. |
| Group Operations With Same Name Together | Enforces standard to improve readability. |
| Naming Conventions | Takes a regular expression and item name and reports all occurrences where the pattern does not match the declaration. |
| Names Of Exception Classes | Names of classes which inherit from Exception should end with Exception. |
| Use Conventional Variable Names | One-character local variable or parameter names should be avoided, except for temporary and looping variables, or where a variable holds an undistinguished value of a type. |

TABLE 15

Performance Audits

| Performance Audits | Description |
|---|---|
| Avoid Declaring Variables Inside Loops | This rule recommends declaring local variables outside the loops since declaring variables inside the loop is less efficient. |
| Append To String Within a Loop | Performance enhancements can be obtained by replacing String operations with StringBuffer operations if a String object is appended within a loop. |
| Complex Loop Expressions | Avoid using complex expressions as repeat conditions within loops. |

TABLE 16

Possible Error Audits

| Possible Error Audits | Description |
|---|---|
| Avoid Public And Package Attributes | Declare the attributes either private or protected, and provide operations to access or change them. |
| Avoid Statements With Empty Body | Avoid statements with empty body. |
| Assignment To For-Loop Variables | 'For'-loop variables should not be assigned. |
| Don't Compare Floating Point Types | Avoid testing for equality of floating point numbers since floating-point numbers that should be equal are not always equal due to rounding problems. |
| Enclosing Body Within a Block | The statement of a loop must always be a block. The 'then' and 'else' parts of 'if' statements must always be blocks. This makes it easier to add statements without accidentally introducing bugs in case the developer forgets to add braces. |
| Explicitly Initialize All Variables | Explicitly initialize all variables. The only reason not to initialize a variable is where it's declared is if the initial value depends on some computation occurring first. |
| Method finalize() Doesn't Call super.finalize() | Calling of super.finalize() from finalize() is good practice of programming, even if the base class doesn't define the finalize() method. This makes class implementations less dependent on each other. |
| Mixing Logical Operators Without Parentheses | An expression containing multiple logical operators should be parenthesized properly. |
| No Assignments In Conditional Expressions | Use of assignment within conditions makes the source code hard to understand. |
| Use 'equals' Instead Of '==' | The '==' operator used on strings checks if two string objects are two identical objects. In most situations, however, one likes to simply check if two strings have the same value. In these cases, the 'equals' method should be used. |
| Use 'L' Instead Of 'l' at the end of integer constant | It is better to use uppercase 'L' to distinguish the letter 'l' from the number '1.' |
| Use Of the 'synchronized' Modifier | The 'synchronized' modifier on methods can sometimes cause confusion during maintenance as well as during debugging. This rule therefore recommends against using this modifier, and instead recommends using 'synchronized' statements as replacements. |

TABLE 17

Superfluous Content Audits

| Superfluous Content Audits | Description |
|---|---|
| Duplicate Import Declarations | There should be at most one import declaration that imports a particular class/package. |

TABLE 17-continued

Superfluous Content Audits

| Superfluous Content Audits | Description |
| --- | --- |
| Don't Import the Package the Source File Belongs To | No classes or interfaces need to be imported from the package to which the source code file belongs. Everything in that package is available without explicit import statements. |
| Explicit Import Of the java.lang Classes | Explicit import of classes from the package 'java.lang' should not be performed. |
| Equality Operations On Boolean Arguments | Avoid performing equality operations on Boolean operands. 'True' and 'false' literals should not be used in conditional clauses. |
| Imported Items Must Be Used | It is not legal to import a class or an interface and never use it. This rule checks classes and interfaces that are explicitly imported with their names—that is not with import of a complete package, using an asterisk. If unused class and interface imports are omitted, the amount of meaningless source code is reduced—thus the amount of code to be understood by a reader is minimized. |
| Unnecessary Casts | Checks for the use of type casts that are not necessary. |
| Unnecessary 'instanceof' Evaluations | Verifies that the runtime type of the left-hand side expression is the same as the one specified on the right-hand side. |
| Unused Local Variables And Formal Parameters | Local variables and formal parameter declarations must be used. |
| Use Of Obsolete Interface Modifier | The modifier 'abstract' is considered obsolete and should not be used. |
| Use Of Unnecessary Interface Member Modifiers | All interface operations are implicitly public and abstract. All interface attributes are implicitly public, final and static. |
| Unused Private Class Member | An unused class member might indicate a logical flaw in the program. The class declaration has to be reconsidered in order to determine the need of the unused member(s). |

Figure 8A:
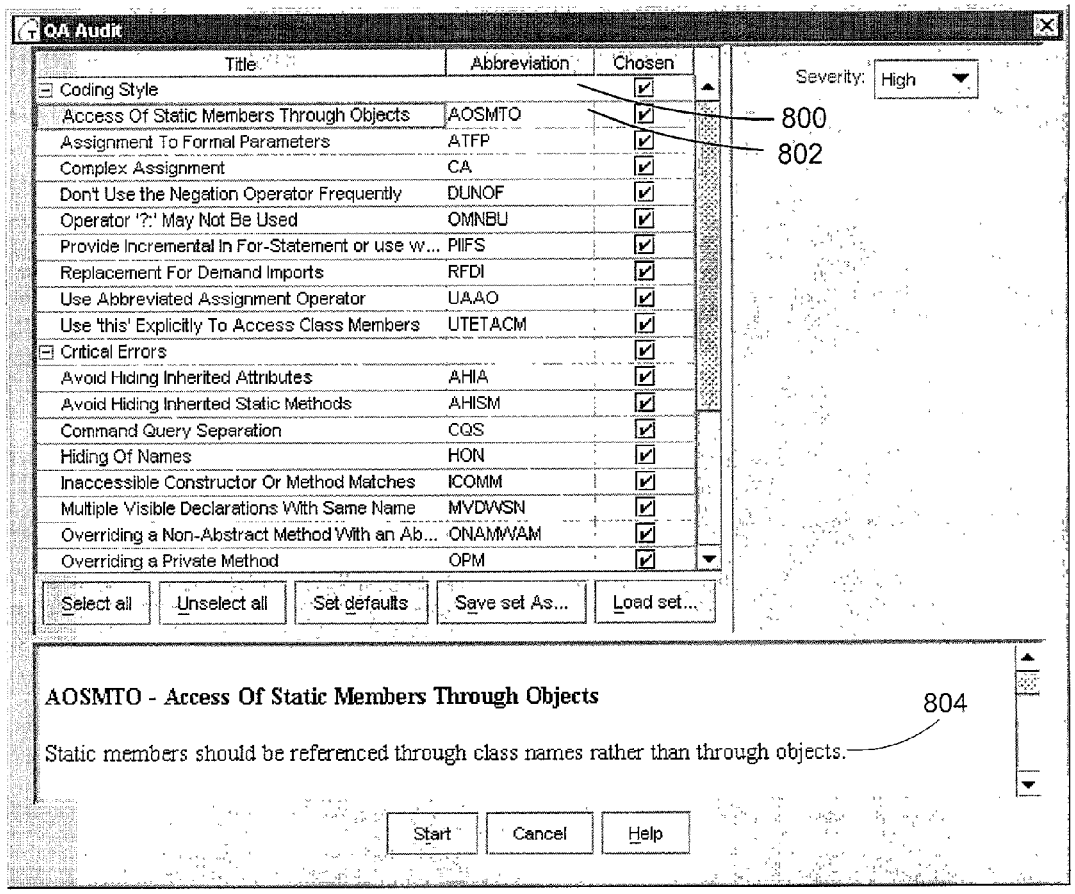
FIG. 8A depicts a user interface displayed by the software development tool depicted in FIG. 2, where the user interface displays a list of predefined criteria which the software development tool checks in the source code.
Figure 8B:
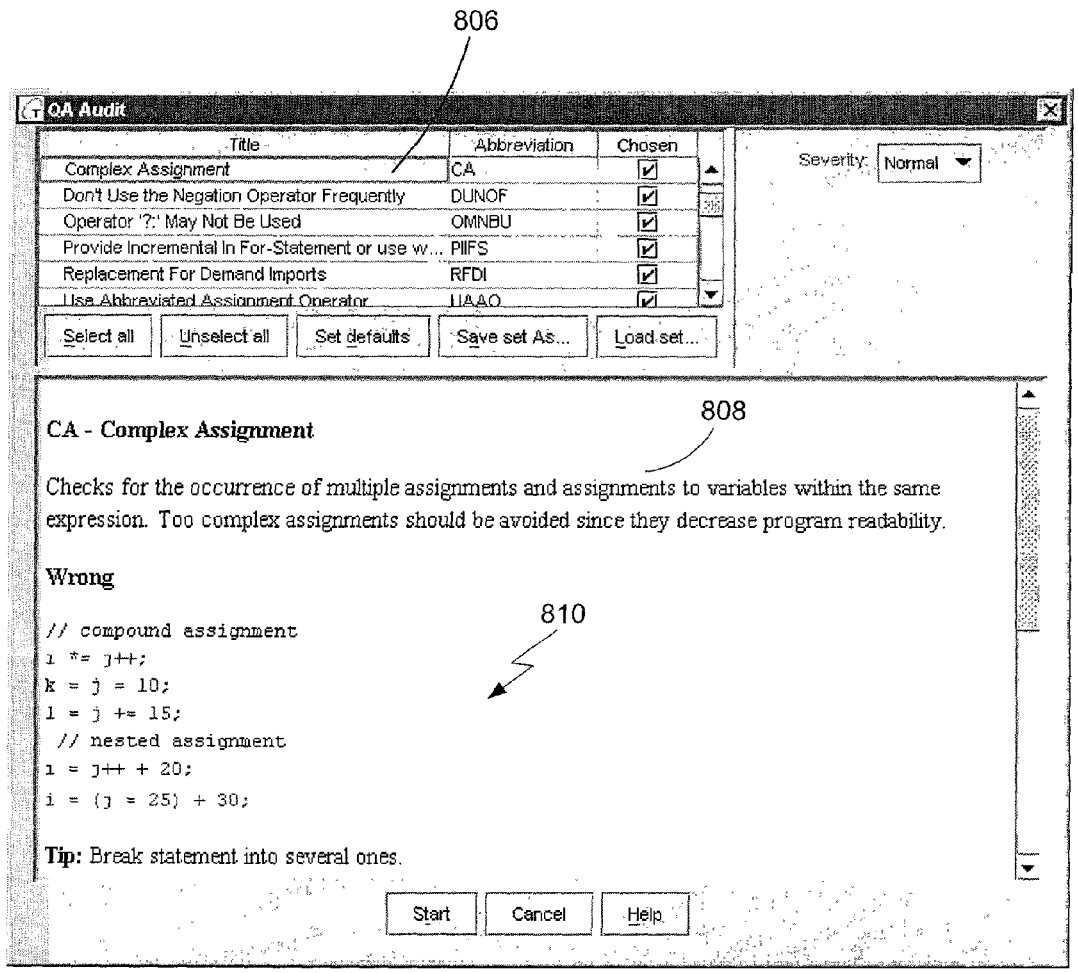
FIG. 8B depicts a user interface displayed by the software development tool depicted in FIG. 2, where the user interface displays the definition of the criteria which the software development tool checks in the source code, and an example of source code which does not conform to the criteria.
Figure 8C:
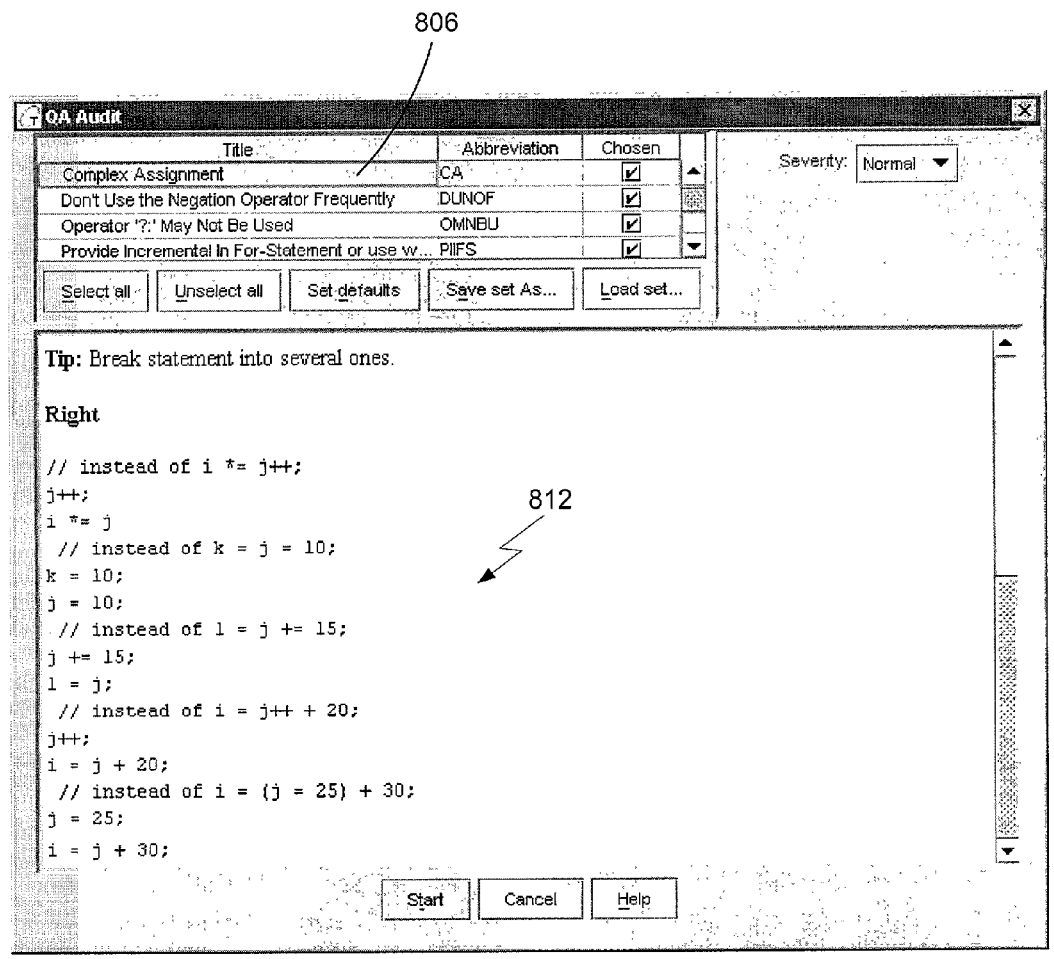
FIG. 8C depicts a user interface displayed by the software development tool depicted in FIG. 2, where the user interface displays an example of source code which conforms to the criteria which the software development tool checks in the source code.

If the QA module determines that the source code does not conform, an error message is provided to the developer. For example, as depicted in FIG. 8A, the software development tool checks for a variety of coding styles 800. If the software development tool were to check for "Access Of Static Members Through Objects" 802, it would verify whether static members are referenced through class names rather than through objects 804. Further, as depicted in FIG. 8B, if the software development tool were to check for "Complex Assignment" 806, the software development tool would check for the occurrence of multiple assignments and assignments to variables within the same expression to avoid complex assignments since these decrease program readability 808. An example of source code having a complex assignment 810 and source code having a non-complex assignment 812 are depicted in FIGS. 8B and 8C, respectively. The QA module of the software development tool scans the source code for other syntax errors well known in the art, as described above, and provides an error message if any such errors are detected.

The improved software development tool of the present invention is used to develop source code in a project. The project comprises a plurality of files and the source code of a chosen one of the plurality of files is written in a given language. The software development tool determines the language of the source code of the chosen file, converts the source code from the language into a language-neutral representation, uses the language-neutral representation to textually display the source code of the chosen file in the language, and uses the language-neutral representation to display a graphical representation of at least a portion of the project. The source code and the graphical representation are displayed simultaneously.

The improved software development tool of the present invention is also used to develop source code. The software development tool receives an indication of a selected language for the source code, creates a file to store the source code in the selected language, converts the source code from the selected language into a language-neutral representation, uses the language-neutral representation to display the source code of the file, and uses the language-neutral representation to display a graphical representation of the file. Again, the source code and the graphical representation are displayed simultaneously.

Moreover, if the source code in the file is modified, the modified source code and a graphical representation of at least a portion of the modified source code are displayed simultaneously. The QA module of the software development tool provides an error message if the modification does not conform to predefined or user-defined styles, as described above. The modification to the source code may be received from the display of the source code, the display of the graphical representation of the project, or via some other independent software to modify the code. The graphical representation of the project may be in Unified Modeling Language; however, one skilled in the art will recognize that other graphical representations of the source code may be displayed. Further, although the present invention is described and shown using the various views of the UML, one of ordinary skill in the art will recognize that other views may be displayed.

Figure 9:
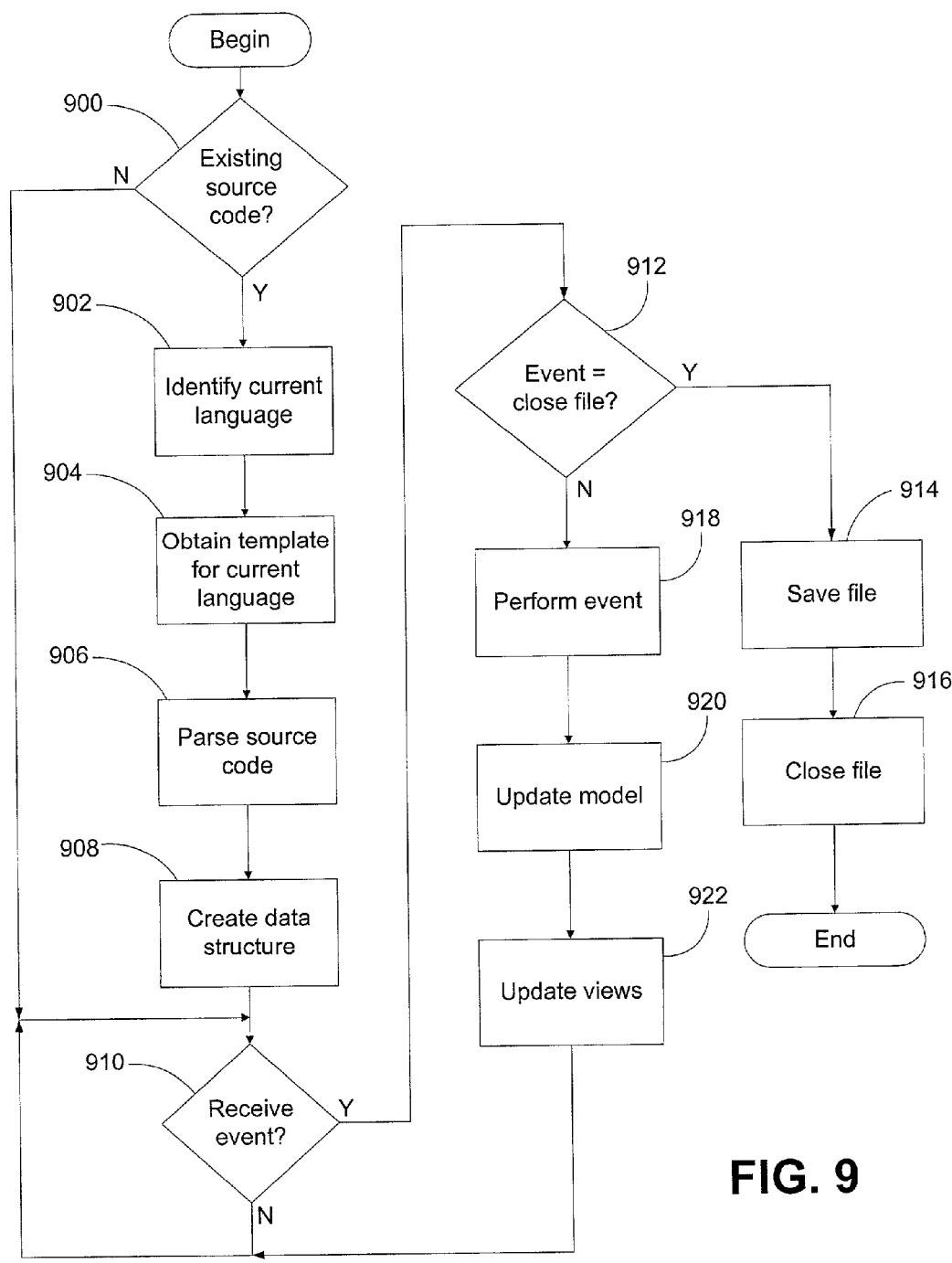
FIG. 9 depicts a flow diagram of the steps performed by the software development tool depicted in FIG. 2.

FIG. 9 depicts a flow diagram of the steps performed by the software development tool to develop a project in accordance with methods and systems consistent with the present invention. As previously stated, the project comprises a plurality of files. The developer either uses the software development tool to open a file that contains existing source code, or to create a file in which the source code will be developed. If the software development tool is used to open the file, determined in step 900, the software development tool initially determines the programming language in which the code is written (step 902). The language is identified by the extension of the file, e.g., ".java" identifies source code written in the Java™ language, while ".cpp" identifies source code written in C++. The software development tool then obtains a template for the current programming language, i.e., a collection of generalized definitions for the particular language that can be used to build the data structure (step 904). For example, the definition of a new Java™ class contains a default name, e.g., "Class1," and the default code, "public class Class1 {}." Such templates are well known in the art. For example, the "Microsoft Foundation Class Library" and the "Microsoft Word Template For Business Use Case Modeling" are examples of standard template libraries from which programmers can choose individual template classes. The software development tool uses the template to parse the source code (step 906), and create the data structure (step 908). After creating the data structure or if there is no existing code, the software development tool awaits an event, i.e., a modification or addition to the source code by the developer (step 910). If an event is received and the event is to close the file (step 912), the file is saved (step 914) and closed (step 916). Otherwise, the software development tool performs the event (step 918), i.e., the tool makes the modification. The software development tool then updates the TMM or model (step 920), as discussed in detail below, and updates both the graphical and the textual views (step 922).

Figure 10A:
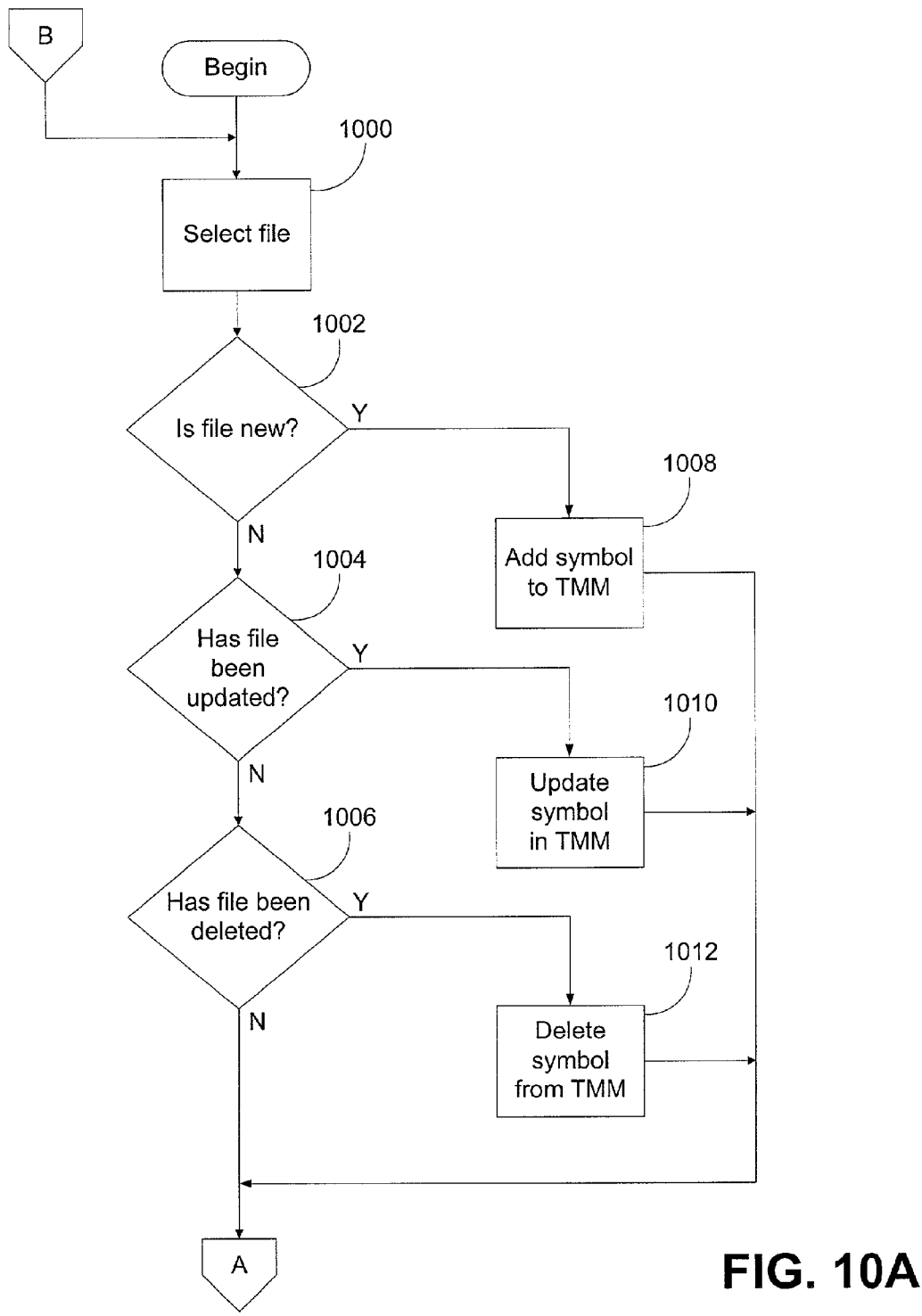
FIGS. 10A and 10B depict a flow diagram illustrating the update model step of FIG. 9.
Figure 10B:
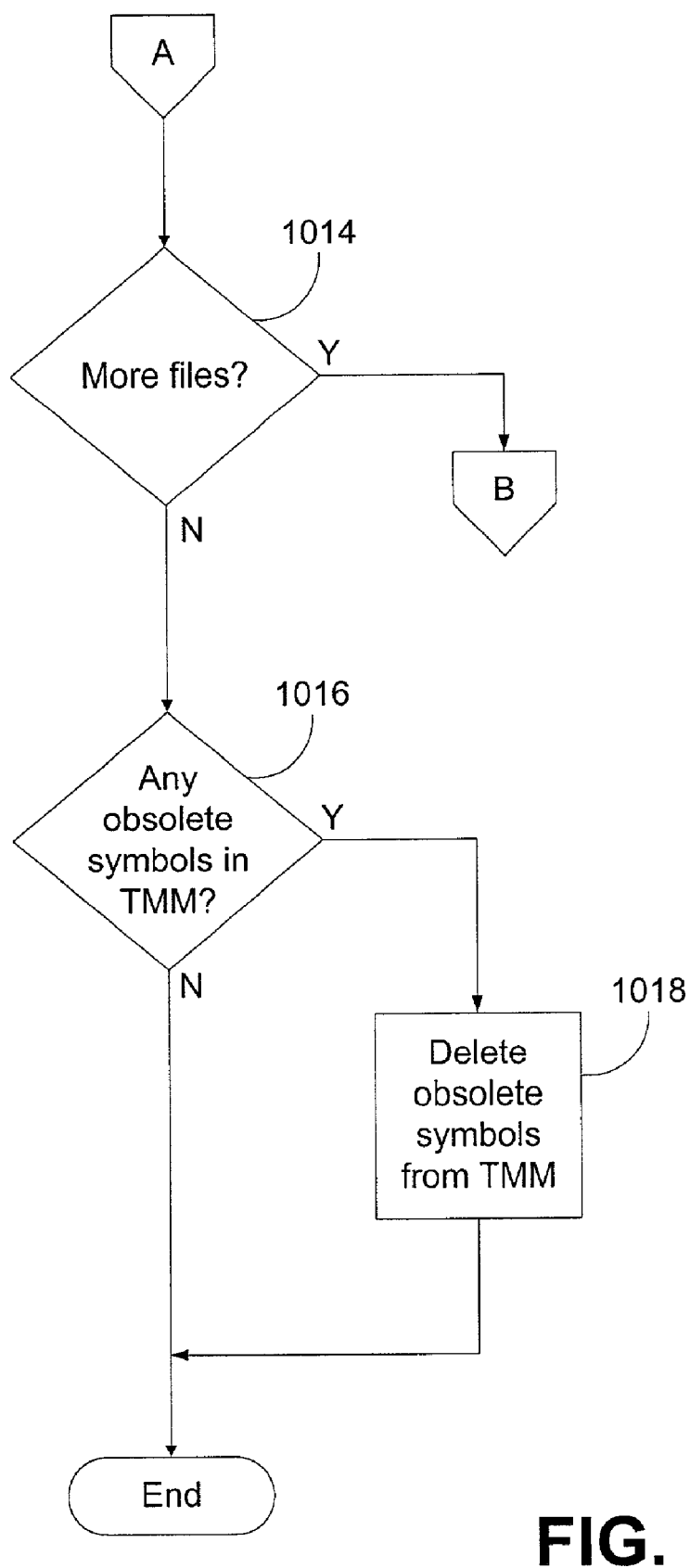

FIGS. 10A and 10B depict a flow diagram illustrating the update model step of FIG. 9. The software development tool selects a file from the project (step 1000), and determines whether the file is new (step 1002), whether the file has been updated (step 1004), or whether the file has been deleted (step 1006). If the file is new, the software development tool adds the additional symbols from the file to the TMM (step 1008). To add the symbol to the TMM, the software development tool uses the template to parse the symbol to the TMM. If the file has been updated, the software development tool updates the symbols in the TMM (step 1010). Similar to the addition of a symbol to the TMM, the software development tool uses the template to parse the symbol to the TMM. If the file has been deleted, the software development tool deletes the symbols in the TMM (step 1012). The software development tool continues this analysis for all files in the project. After all files are analyzed (step 1014), any obsolete symbols in the TMM (step 1016) are deleted (step 1018).

Figure 11:
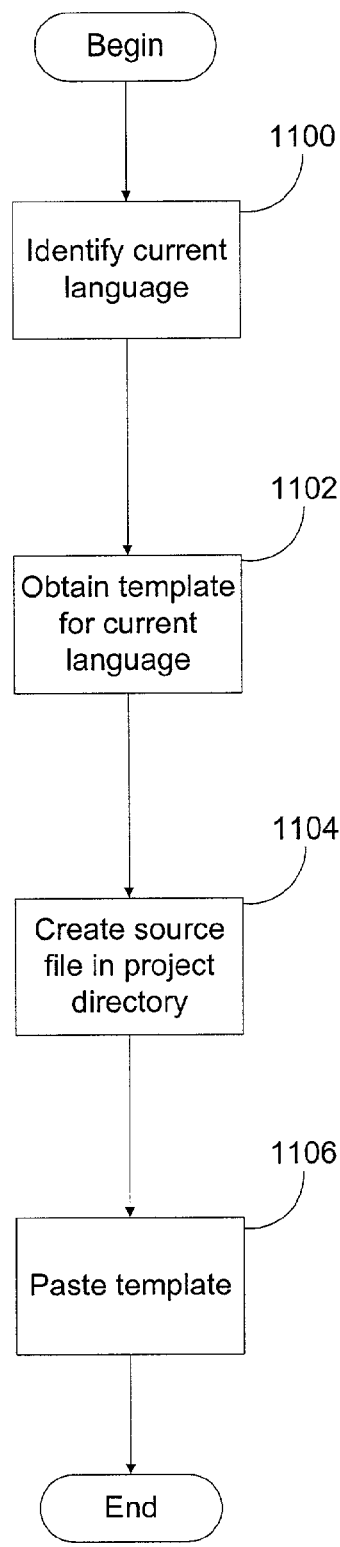
FIG. 11 depicts a flow diagram of the steps performed by the software development tool in FIG. 2 when creating a class.

FIG. 11 depicts a flow diagram illustrating the performance of an event, specifically the creation of a class, in accordance with methods and systems consistent with the present invention. After identifying the programming language (step 1100), the software development tool obtains a template for the language (step 1102), creates a source code file in the project directory (step 1104), and pastes the template onto the TMM (step 1106). The project directory corresponds to the SCI model 302 of FIG. 3. Additional events which a developer may perform using the software development tool include the creation, modification or deletion of packages, projects, attributes, interfaces, links, operations, and the closing of a file.

Figure 12:
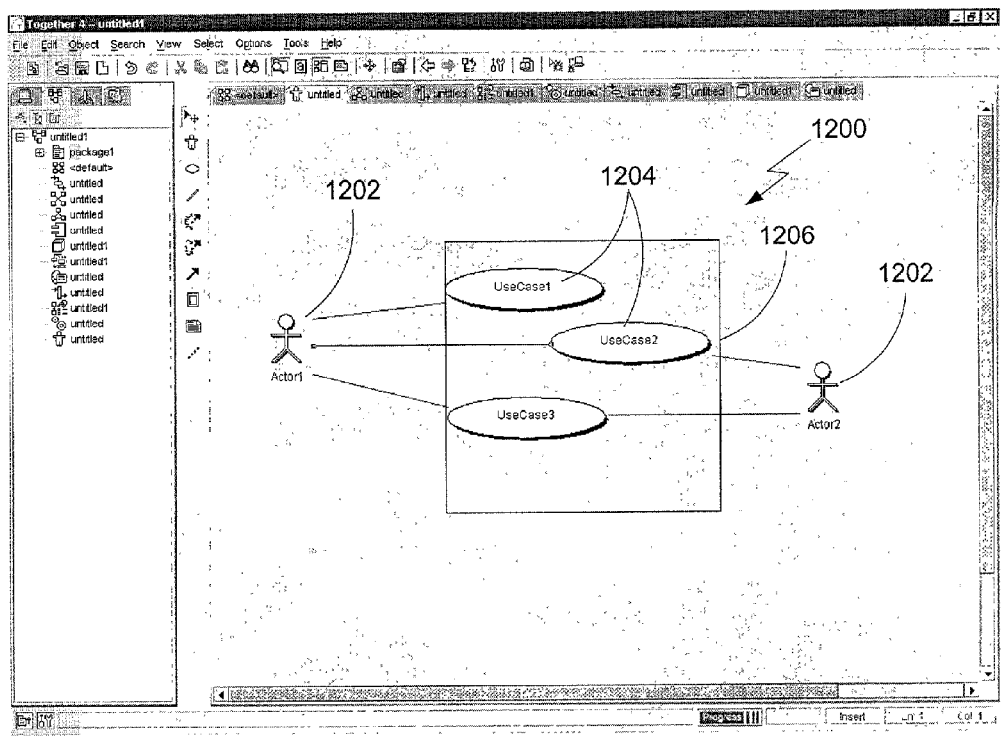
FIG. 12 depicts a user interface displayed by the software development tool depicted in FIG. 2, where the user interface displays a use case diagram of source code.
Figure 13:
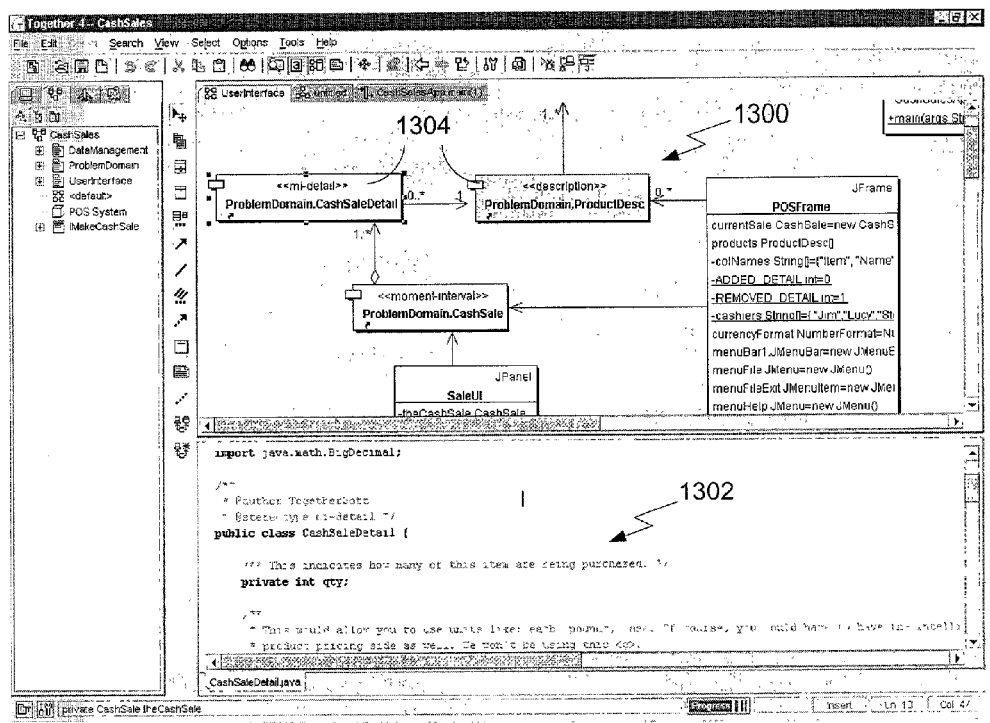
FIG. 13 depicts a user interface displayed by the software development tool depicted in FIG. 2, where the user interface displays both a class diagram and a textual view of source code.

The software development tool is collectively broken into three views of the application: the static view, the dynamic view, and the functional view. The static view is modeled using the use-case and class diagrams. A use case diagram 1200, depicted in FIG. 12, shows the relationship among actors 1202 and use cases 1204 within the system 1206. A class diagram 1300, depicted in FIG. 13 with its associated source code 1302, on the other hand, includes classes 1304, interfaces, packages and their relationships connected as a graph to each other and to their contents.

Figure 14:
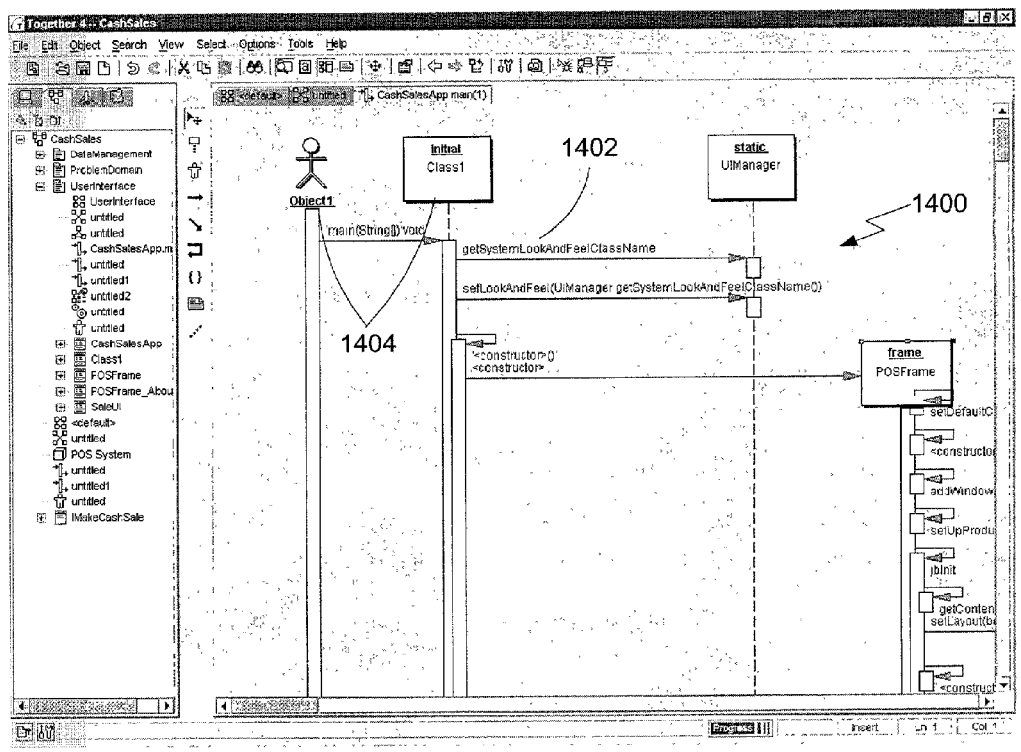
FIG. 14 depicts a user interface displayed by the software development tool depicted in FIG. 2, where the user interface displays a sequence diagram of source code.
Figure 15:
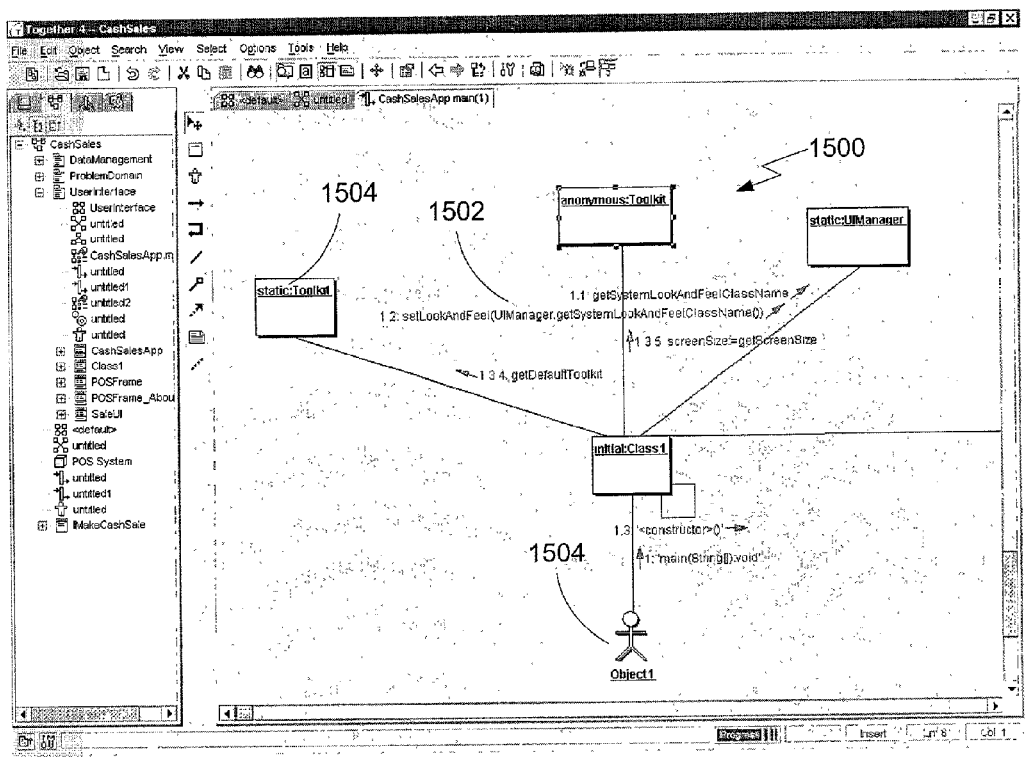
FIG. 15 depicts a user interface displayed by the software development tool depicted in FIG. 2, where the user interface displays a collaboration diagram of source code.

The dynamic view is modeled using the sequence, collaboration and statechart diagrams. As depicted in FIG. 14, a sequence diagram 1400 represents an interaction, which is a set of messages 1402 exchanged among objects 1404 within a collaboration to effect a desired operation or result. In a sequence diagram 1400, the vertical dimension represents time and the horizontal dimension represents different objects. A collaboration diagram 1500, depicted in FIG. 15, is also an interaction with messages 1502 exchanged among objects 1504, but it is also a collaboration, which is a set of objects 1504 related in a particular context. Contrary to sequence diagrams 1400 (FIG. 14), which emphasize the time ordering of messages along the vertical axis, collaboration diagrams 1500 (FIG. 15) emphasize the structural organization of objects.

Figure 16:
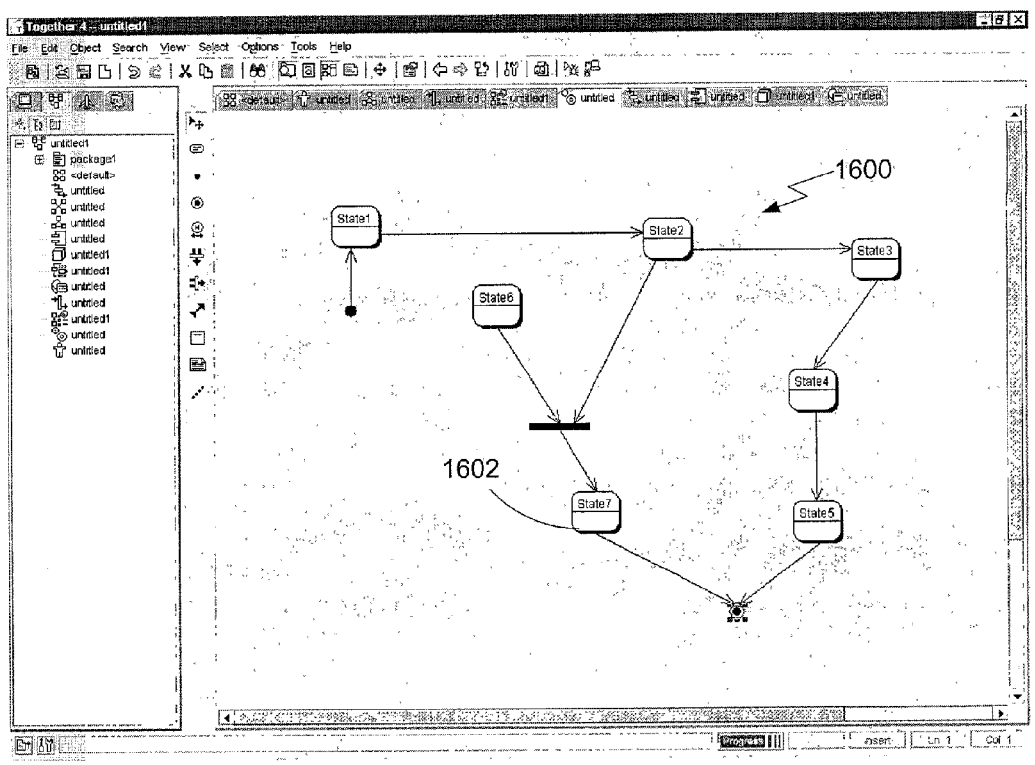
FIG. 16 depicts a user interface displayed by the software development tool depicted in FIG. 2, where the user interface displays a statechart diagram of source code.

A statechart diagram 1600 is depicted in FIG. 16. The statechart diagram 1600 includes the sequences of states 1602 that an object or interaction goes through during its life in response to stimuli, together with its responses and actions. It uses a graphic notation that shows states of an object, the events that cause a transition from one state to another, and the actions that result from the transition.

Figure 17:
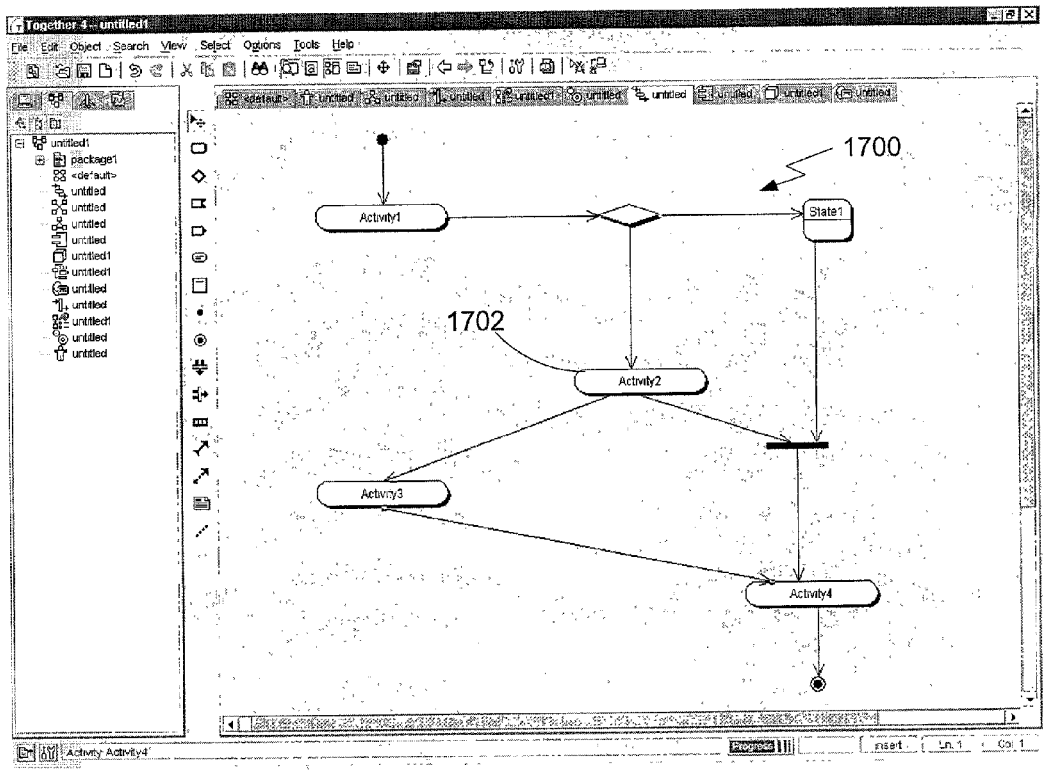
FIG. 17 depicts a user interface displayed by the software development tool depicted in FIG. 2, where the user interface displays an activity diagram of source code.

The functional view can be represented by activity diagrams 1700 and more traditional descriptive narratives such as pseudocode and minispecifications. An activity diagram 1700 is depicted in FIG. 17, and is a special case of a state diagram where most, if not all, of the states are action states 1702 and where most, if not all, of the transitions are triggered by completion of the actions in the source states. Activity diagrams 1700 are used in situations where all or most of the events represent the completion of internally generated actions.

Figure 18:
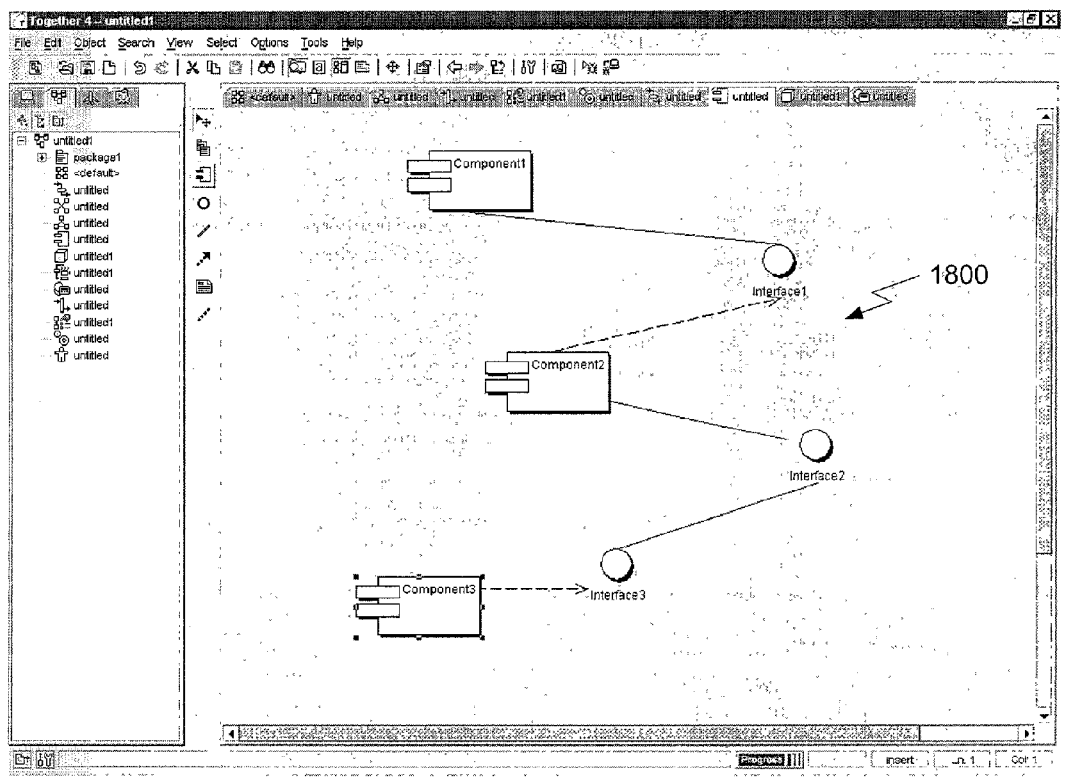
FIG. 18 depicts a user interface displayed by the software development tool depicted in FIG. 2, where the user interface displays a component diagram of source code.
Figure 19:
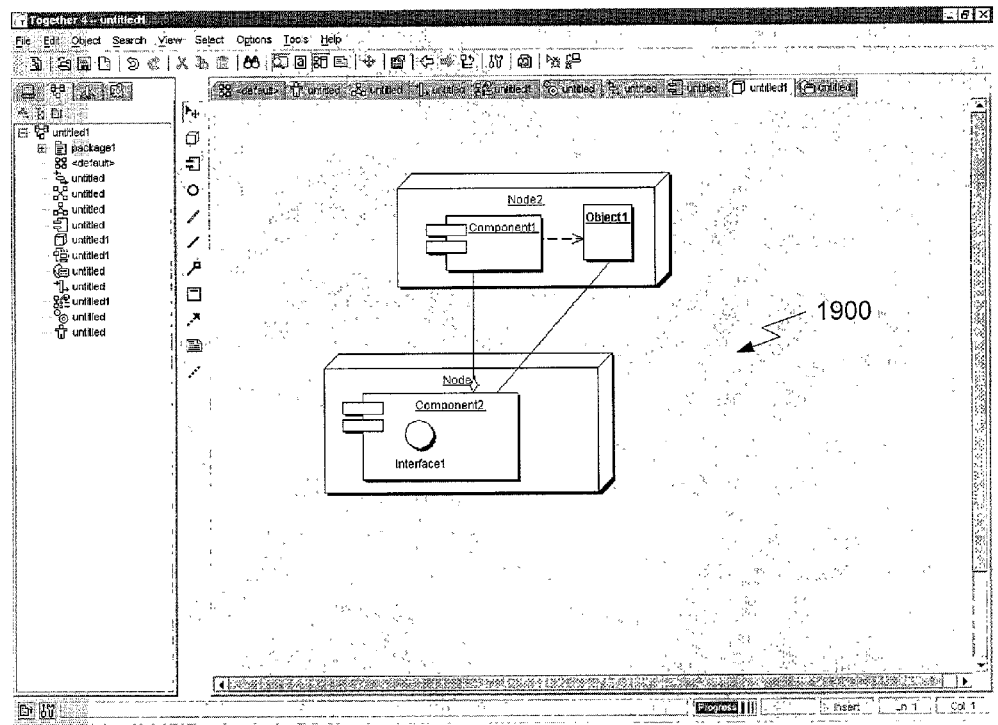
FIG. 19 depicts a user interface displayed by the software development tool depicted in FIG. 2, where the user interface displays a deployment diagram of source code.

There is also a fourth view mingled with the static view called the architectural view. This view is modeled using package, component and deployment diagrams. Package diagrams show packages of classes and the dependencies among them. Component diagrams 1800, depicted in FIG. 18, are graphical representations of a system or its component parts. Component diagrams 1800 show the dependencies among software components, including source code components, binary code components and executable components. As depicted in FIG. 19, Deployment diagrams 1900 are used to show the distribution strategy for a distributed object system. Deployment diagrams 1900 show the configuration of run-time processing elements and the software components, processes and objects that live on them.

Although discussed in terms of class diagrams, one skilled in the art will recognize that the software development tool of the present invention may support these and other graphical views.

Animation of Diagrams

To assist a developer in debugging source code, the software development tool displays the source code as well as a graphical display of the source code, and as the software development tool compiles each line of source code, the portion of the graphical representation corresponding to the compiled source code is displayed in a visually distinct manner, e.g., highlighted. This allows a developer to visually track the execution of the compiled code. As a result, the software development tool animates the execution of the source code. The animation may proceed through the entire source code without interruption. Alternatively, the animation may continue until the software development tool stops the animation. For example, the software development tool may proceed through each line of source code until the next line causes an object or a link to be displayed in a visually distinctive manner. In another embodiment, the developer may indicate at which line the animation should end. In yet another embodiment, the software development tool compiles and debugs the line of code, and the animation proceeds until the software development tool detects an error in the source code.

Figure 20:
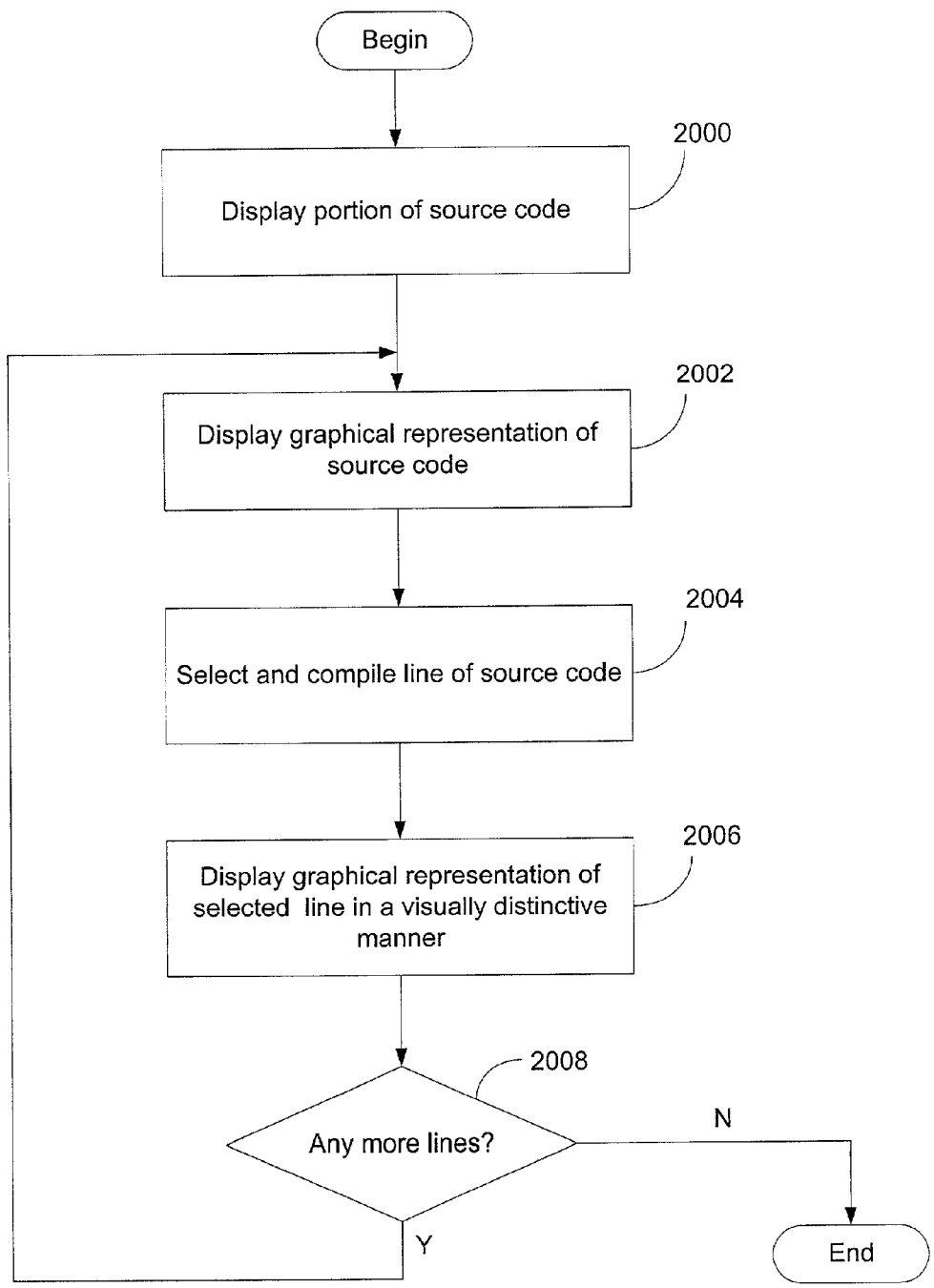
FIG. 20 depicts a flow diagram of the steps performed by the software development tool depicted in FIG. 2 using a first embodiment of the animation feature, in accordance with methods and systems consistent with the present invention.

FIG. 20 depicts a flow diagram illustrating the steps performed by the software development tool during the animation of the source code. In this embodiment, the software development tool initiates an automated process that processes each of the lines. While the automated process processes each of the lines, the software development tool displays the portion of the graphical representation that corresponds to the line in a visually distinctive manner so that it visually appears that progression of the automated process is animated.

Figure 21:
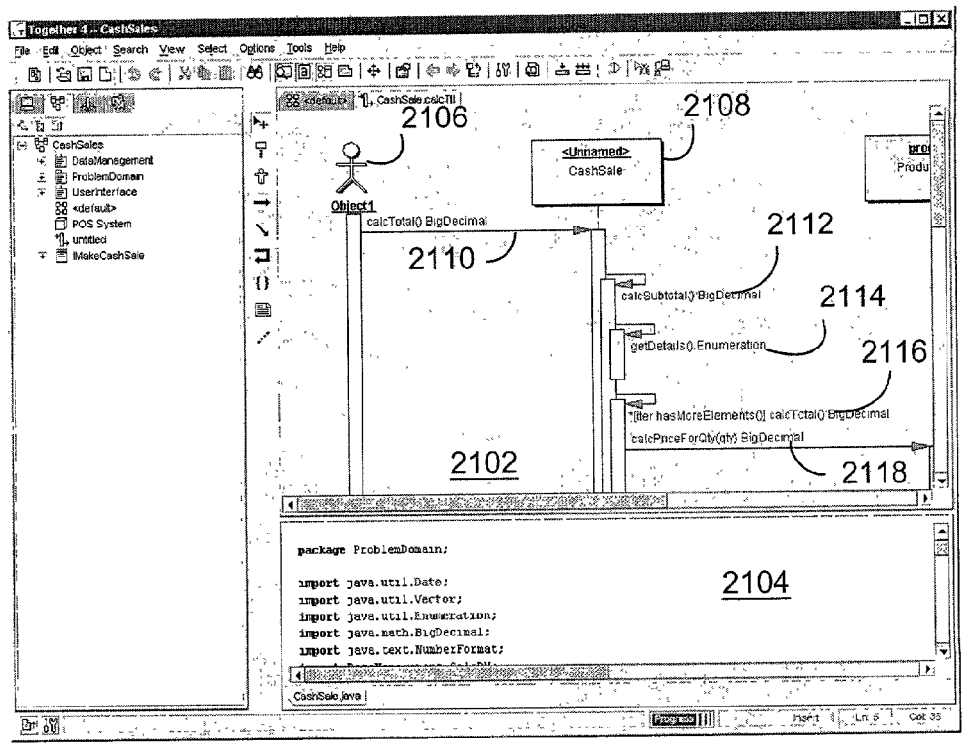
FIG. 21 depicts a user interface displayed by the software development tool depicted in FIG. 2, where the user interface displays a sequence diagram of source code.
Figure 22:
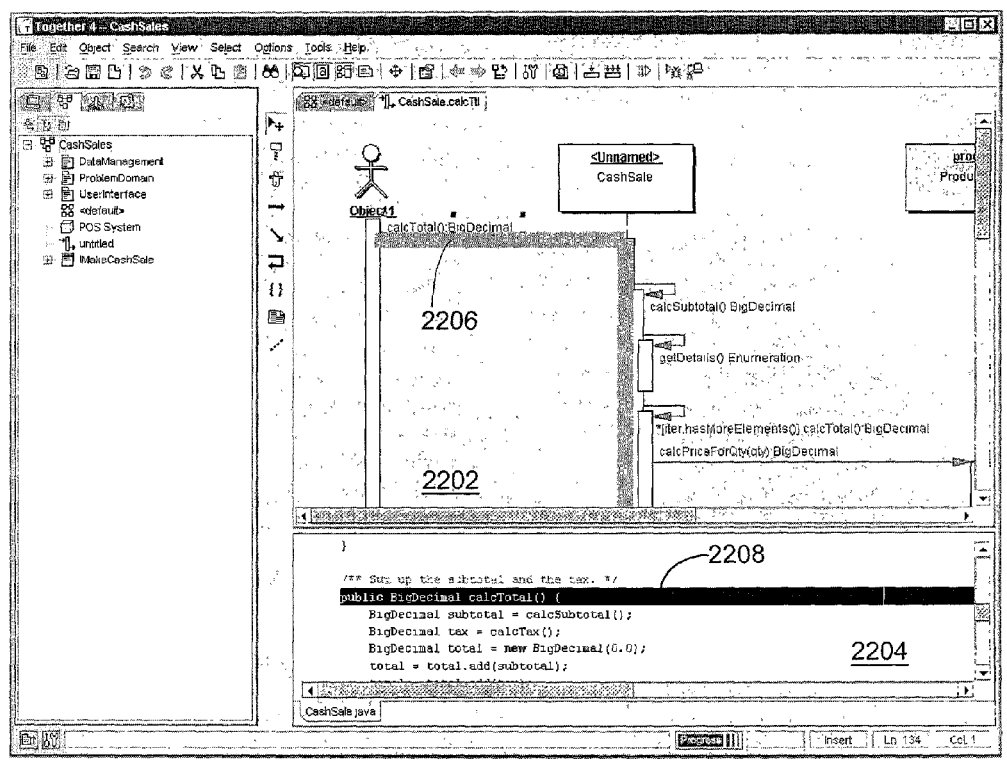
FIG. 22 depicts the user interface of FIG. 21 after a first step of the animation.
Figure 23:
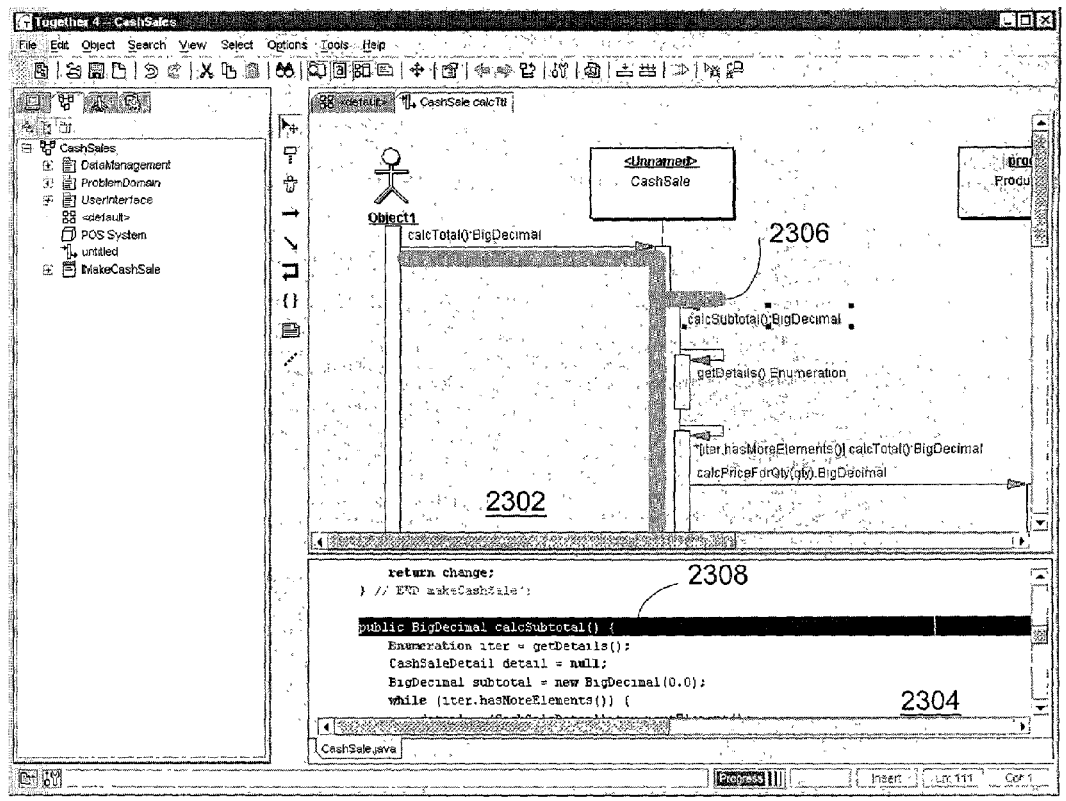
FIG. 23 depicts the user interface of FIG. 22 after a second step of the animation.
Figure 24:
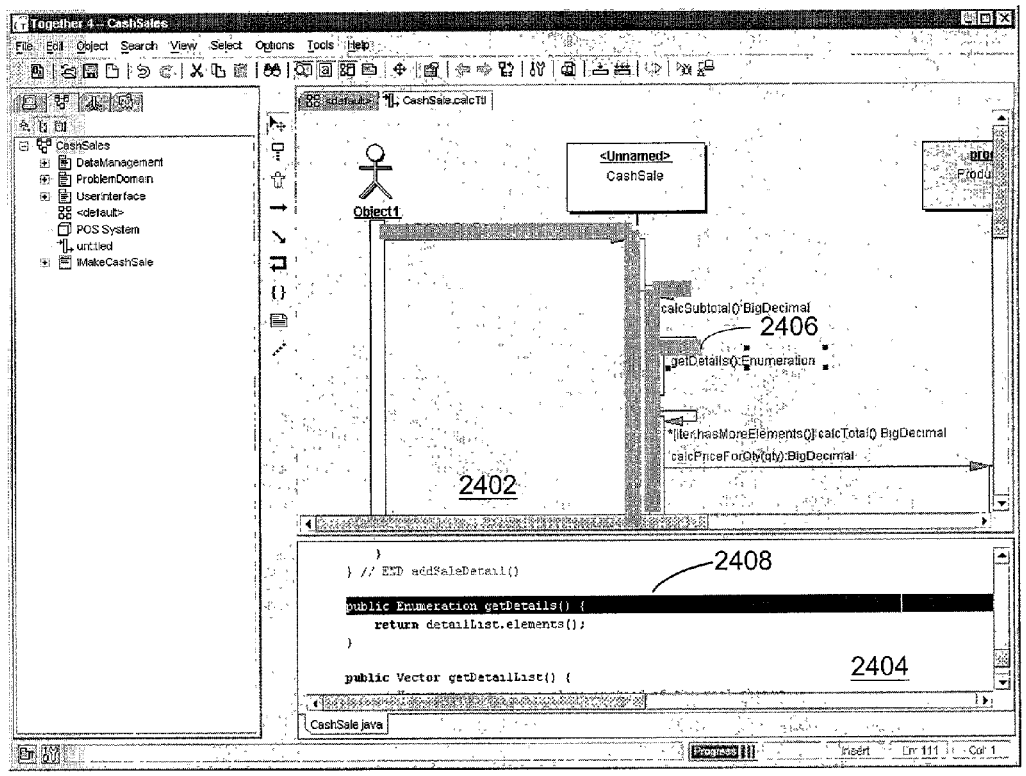
FIG. 24 depicts the user interface of FIG. 23 after a third step of the animation.
Figure 25:
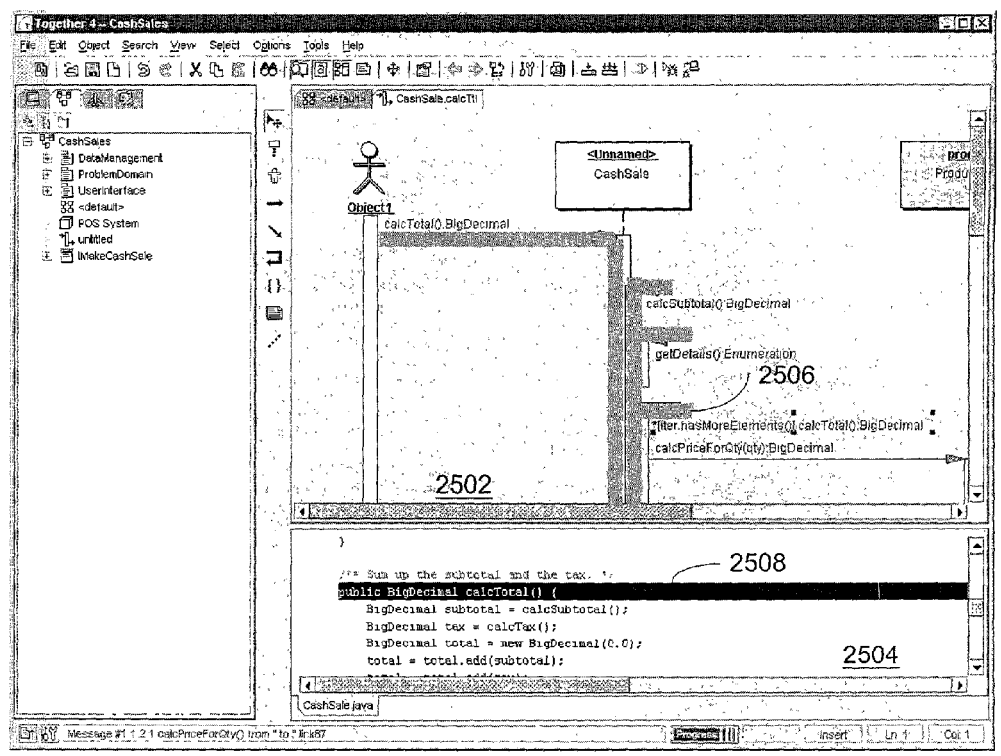
FIG. 25 depicts the user interface of FIG. 24 after a fourth step of the animation.
Figure 26:
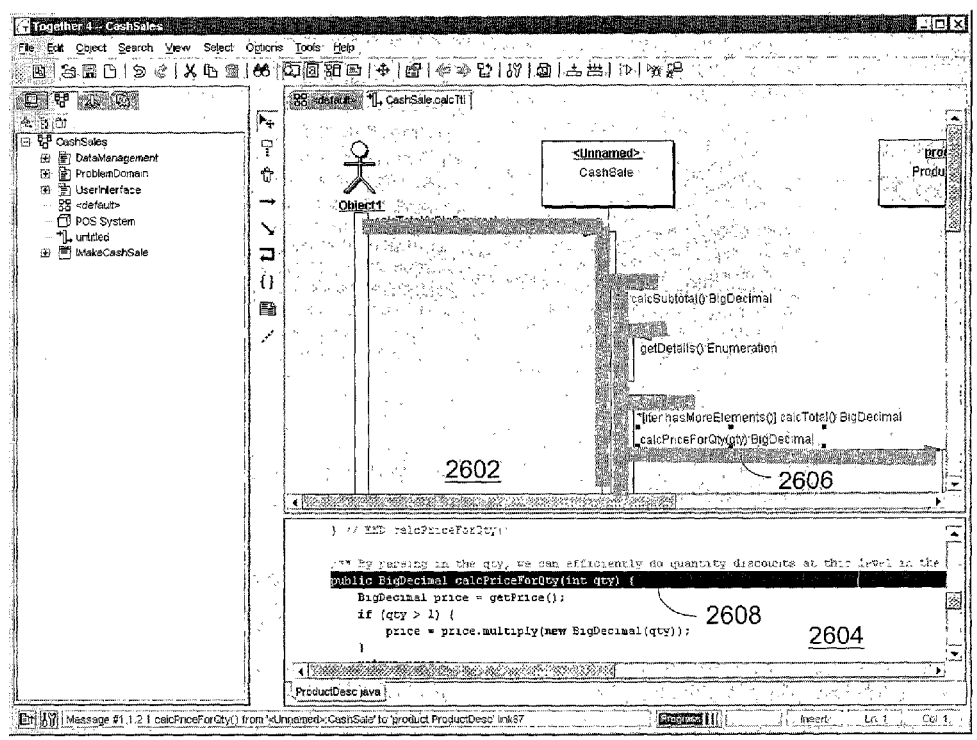
FIG. 26 depicts the user interface of FIG. 25 after a fifth step of the animation.

As discussed above, the software development tool uses the source code to generate the TMM, which stores a language-neutral representation of the source code. The first step performed by the software development tool is to display a portion of the source code in a project (step 2000). As discussed above, the text of the source code may be obtained directly from the source code file, or it may be generated from the language-neutral representation in the TMM. The software development tool uses the TMM to generate the graphical representation of the source code in the project so that it is simultaneously displayed with the source code (step 2002). For example, FIG. 21 depicts user interface 2100 with both a graphical representation 2102 and a portion of the text of the source code 2104. The graphical representation 2102 depicted in FIG. 21 is a sequence diagram. As is well known, a sequence diagram depicts object interactions arranged in a time sequence. In particular, it shows the objects participating in the interaction and the sequence of messages exchanged by or between the objects. The messages indicate the methods performed by or between the objects. Thus, in FIG. 21, the sequence diagram shows the interaction of Object1 2106 and CashSale 2108. As depicted, Object1 2106 sends a message, "calcTotal( ):BigDecimal" 2110, to CashSale 2108. Thus, the software development tool performs the method calcTotal( ) between Object1 2106 and CashSale 2108. The sequence diagram also illustrates that CashSale 2108 performs self-calls, i.e., messages that an object sends to itself. The self-calls performed by CashSale 2108 are calcSubtotal( ):BigDecimal 2112, getDetails( ):Enumeration 2114, and [iter.hasMoreElements( )]calcTotal( ):BigDecimal 2116. These messages indicate methods performed by CashSale. The "[iter.hasMoreElements( )]" indicates that CashSale repeatedly calls the method calcTotal( ). CashSale 2108 also sends the message "calcPriceForQty(qty):BigDecimal" 2118 to the next object (not within view of the window). Thus, the software development tool performs the method calcPriceForQty(qty) between CashSale 2108 and the next object (not within view of the window).

After displaying the source code, the software development tool selects the first line of source code and compiles it into object code (step 2004). Alternatively, the software development tool may obtain the object code from an external tool, such as a debugger. After the software development tool compiles each line of source code, the software development tool displays the portion of the graphical representation that corresponds to the compiled line just compiled in step 2004 in a visually distinctive manner (step 2006). For example, the graphical representation may be highlighted, the color of the graphical representation may change, the font of the text within the graphical representation may change, or the thickness of the links may change. Each line of source code typically represents either part of an object, or it represents the link between objects. Thus, the graphical representation of a line of source code refers to the graphical representation of the object containing the line of code or the graphical representation of the interaction between objects. For example, the source code displayed in FIG. 21 includes the following code in Java™ programming language:

```
public class CashSale {
    public final static double TAX_RATE = 0.06;
    private Vector detailList;
    . . .
    public BigDecimal calcSubtotal() {
        . . .
    }
}
```

As is well known, "public class CashSale" defines class "CashSale" 2108, shown in FIG. 21. Thus, after the software development tool compiles this line of source code, the software development tool displays "CashSale" 2108 in a visually distinctive manner. The next line of source code, "public final static double TAX_RATE=0.06" represents a part of class "CashSale" 2108 rather than a method performed by or between the objects. Thus, this line does not alter the graphical representation of the source code because CashSale has already been displayed in a graphically distinctive manner. Similarly, "private Vector detailList" represents a part of the class "CashSale" 2108 and does not alter the graphical display. Contrary to the previous lines, the next line of source code, "public BigDecimal calcSubtotal( )" is a method performed by object "CashSale" 2108. Accordingly, the software development tool represents the graphical representation of this method, i.e., calcSubtotal( ):BigDecimal 2112, in a graphically distinctive manner. The software development tool uses the TMM to identify and visually modify the portion of the graphical representation that corresponds to the compiled line of code.

Returning to the process defined by FIG. 20, the next step performed by the software development tool is to determine whether there are any more lines of source code to be compiled (step 2008). If there are any more lines of source code to be compiled, the software development tool compiles the next line of source code at step 2004. If there are no more lines of code to compile, the process ends. An example of the animation performed by the software development tool using the process defined in FIG. 20 is depicted in FIGS. 21–26.

As discussed above, the graphical representation 2102 and a portion of the text of the source code 2104 are initially displayed. As depicted in the sequence diagram of FIG. 21, the method calcTotal( ) 2106 initially calls class CashSale 2108. The line 2208 of source code 2204 shown in FIG. 22 defines method calcTotal( ). After the software development tool compiles this line 2208 of source code 2204, the software development tool displays the graphical representation 2202 of the line 2206 in a visually distinctive manner on the user interface 2200. The software development tool continues to compile each line of source code until it reaches line 2308 of the source code 2304 shown in the user interface 2300 of FIG. 23. After the software development tool compiles the line 2308 of source code 2304, the software development tool displays the graphical representation 2302 of the line 2306 in a visually distinctive manner. The software development continues to compile each line of source code until it reaches line 2408 of the source code 2404 shown in the user interface 2400 of FIG. 24. After the software development tool compiles the line 2408 of source code 2404, the software development tool displays the graphical representation 2402 of the line 2406 in a visually distinctive manner. The software development tool continues compiling additional lines of source code until it reaches line 2508 of the source code 2504 shown in the user interface 2500 of FIG. 25. After the software development tool compiles the line 2508 of source code 2504, the software development tool displays the graphical representation 2502 of the line 2506 in a visually distinctive manner. Finally, the software development tool compiles more lines of source code until it reaches line 2608 of the source code 2604 shown in the user interface 2600 of FIG. 26. After the software development tool compiles the line 2608 of source code 2604, the software development tool displays the graphical representation 2602 of the line 2606 in a visually distinctive manner.

Figure 27:
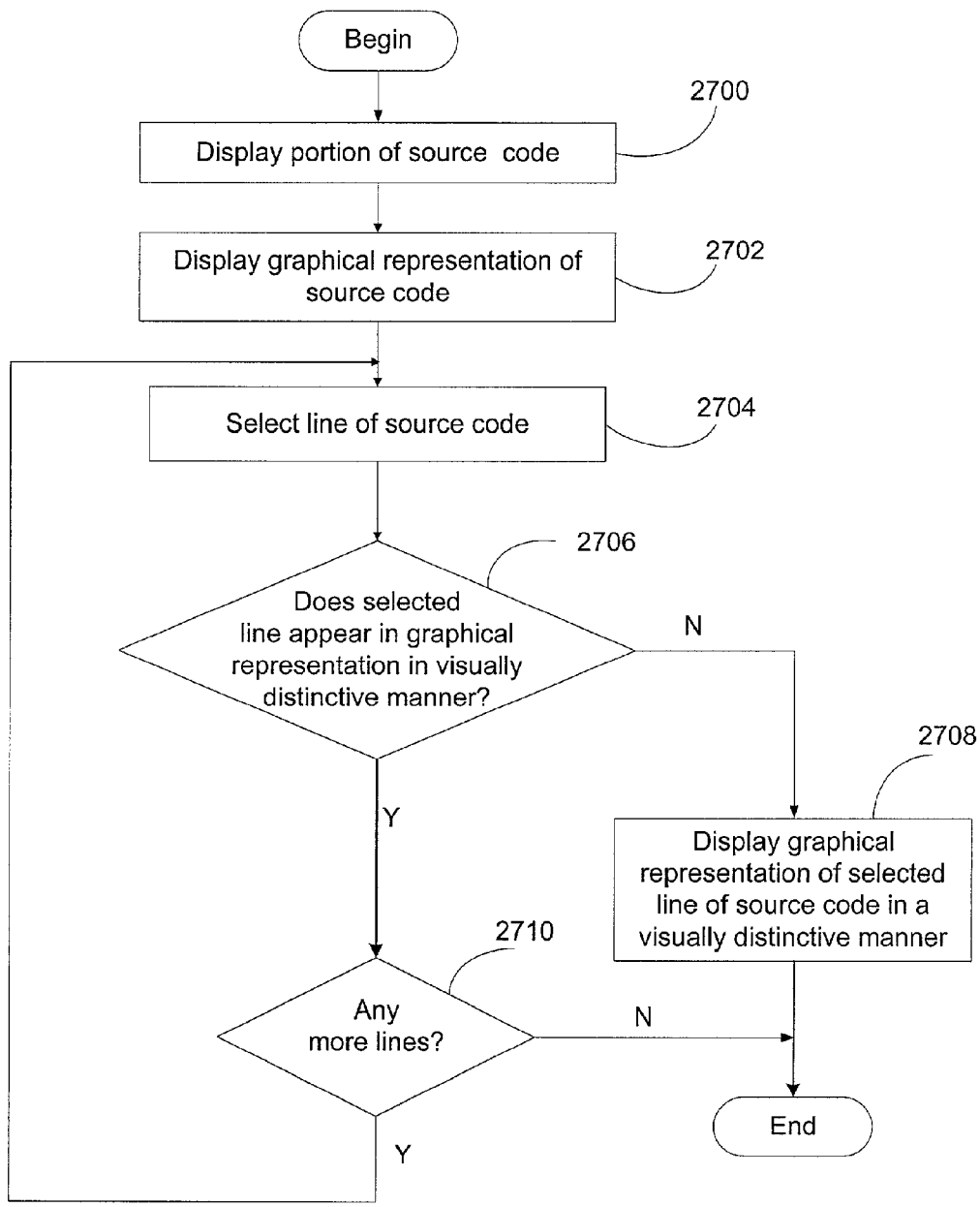
FIG. 27 depicts a flow diagram of the steps performed by the software development tool depicted in FIG. 2 using a second embodiment of the animation feature, in accordance with methods and systems consistent with the present invention.
Figure 28:
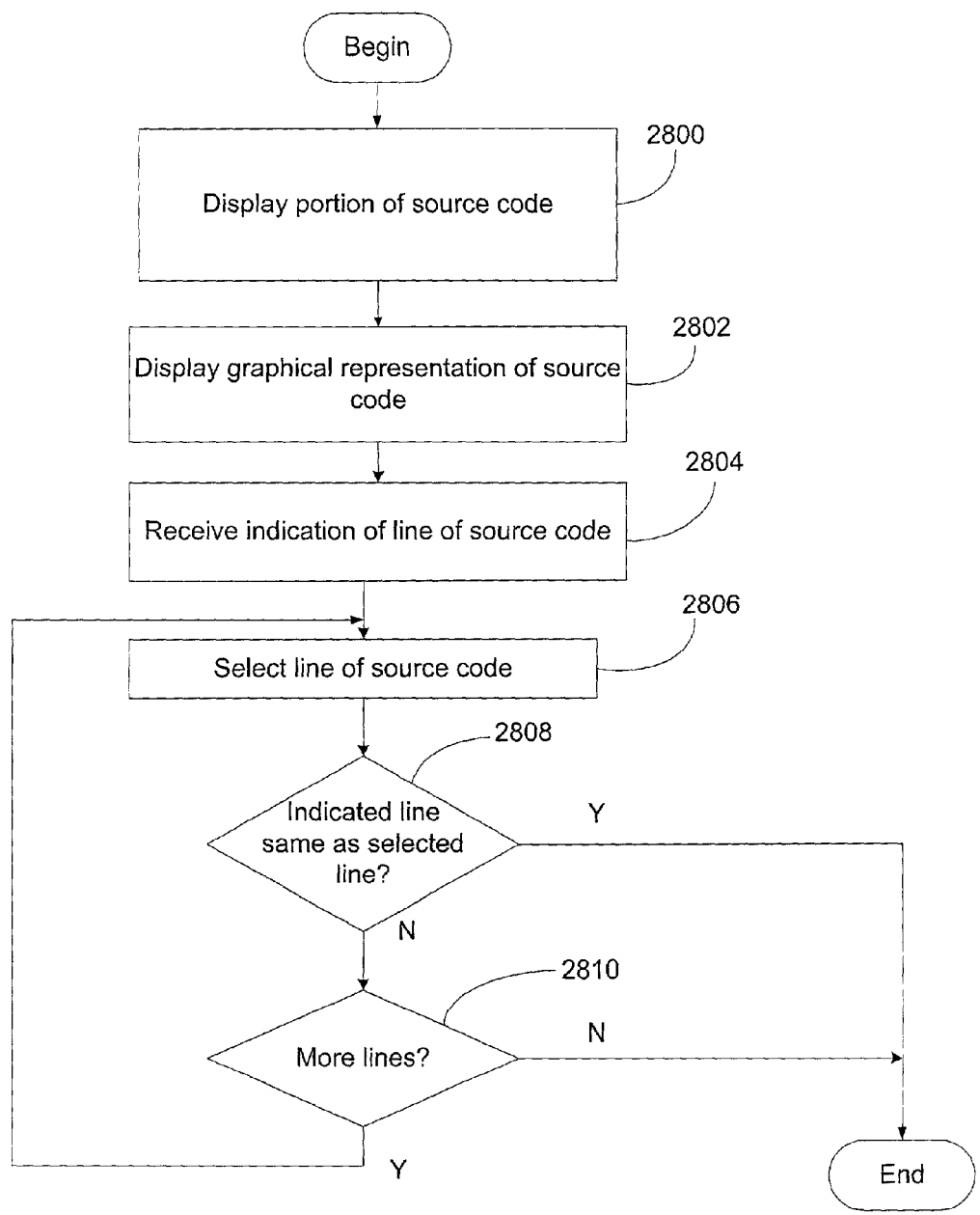
FIG. 28 depicts a flow diagram of the steps performed by the software development tool depicted in FIG. 2 using a third embodiment of the animation feature, in accordance with methods and systems consistent with the present invention.

As discussed above, the software development tool may continue animating the source code until the next line of code visibly modifies of the graphical representation. In this embodiment, the software development tool receives an indication to suspend the automated process when the automated process encounters one of the lines that is represented in the graphical representation. While the automated process is being performed on each of the lines of source code, the software development tool determines whether the line is represented in the graphical representation. If the line is represented in the graphical representation, the software development tool suspends the automated process. FIG. 27 depicts this process. Initially, the software development tool displays the text of the source code (step 2700). The software development tool simultaneously displays a graphical representation of the source code (step 2702). The software development tool then selects a line of the source code (step 2704). The software development tool determines whether the selected line of source code appears in the graphical representation in a visually distinctive manner (step 2706). If the selected line of source code does not appear in the graphical representation in a visually distinctive manner, the software development tool displays the graphical representation of the selected line of source code in a visually distinctive manner (step 2708). At this point, the software development tool visibly modified the graphical representation, and the process ends. If the selected line of source code does appear in the graphical representation in a visually distinctive manner, the software development tool determines whether there are any more lines of source code (step 2710). If there are more lines of source code, the software development tool selects the next line of source code in step 2704. If there are no more lines of source code, the process ends.

In another embodiment, the animation continues until the software development tool reaches a line of source code selected by the developer. The software development tool receives an indication to suspend the automated process when the automated process encounters the selected line. While the automated process is being performed on each of the lines of source code, the software development tool determines whether the line is the selected line. If the line is the selected line, the software development tool suspends the automated process.

In this embodiment, as with the previous examples, the software development tool initially displays the text of the source code (step 2800). The software development tool simultaneously displays the graphical representation of the source code (step 2802). The software development tool receives an indication of a line of source code from the developer (step 2804). This is the line at which animation will end. The next step performed by the software development tool is to select a line of source code (step 2806). The software development tool then determines whether the indicated line is the same as the selected line (step 2808). If the indicated line is the same as the selected line, the process ends. Otherwise, the software development tool determines whether there are any more lines of source code (step 2810). If there are more lines, the software development tool selects the next line of source code at step 2806. If there are no more lines, the process ends.

Figure 29:
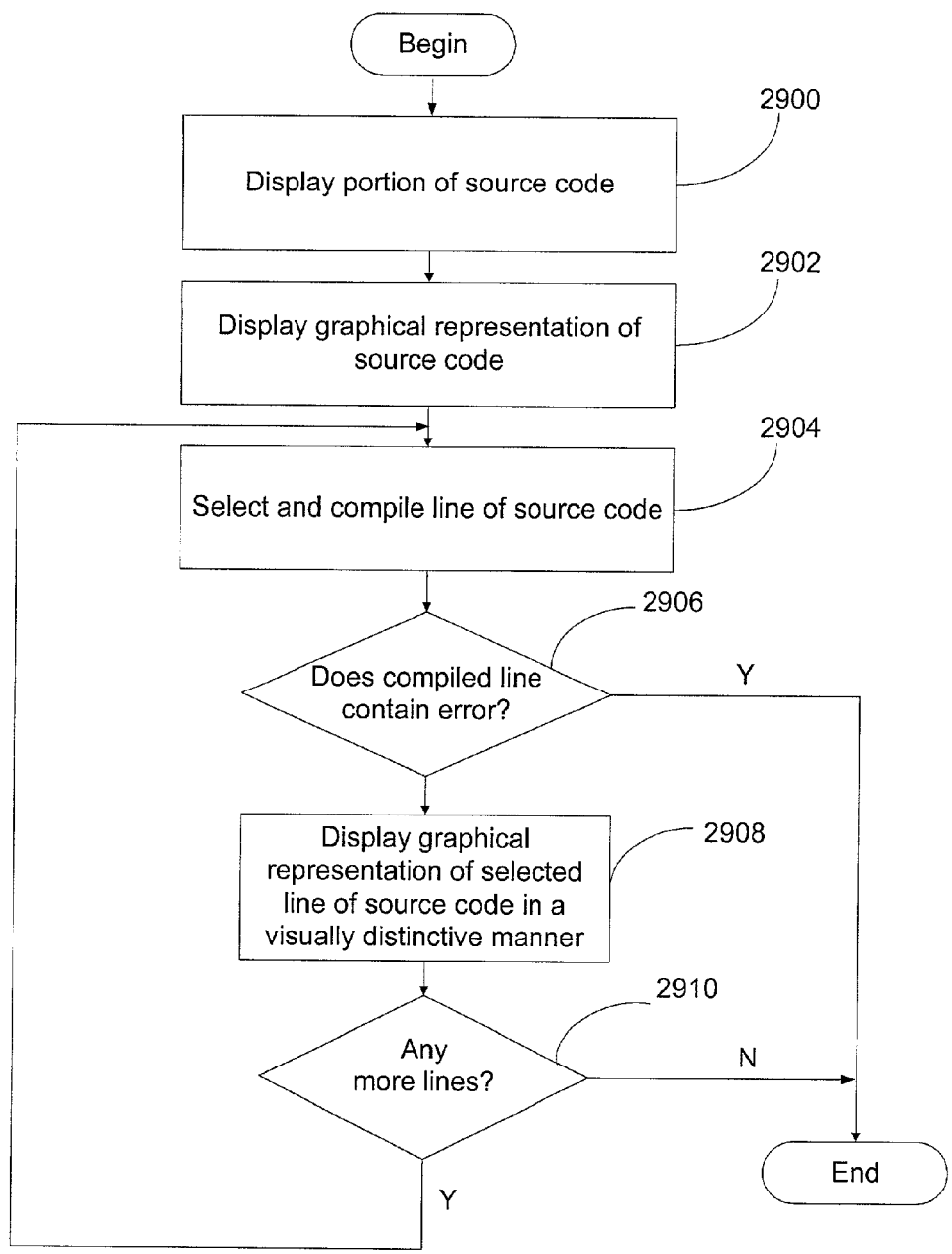
FIG. 29 depicts a flow diagram of the steps performed by the software development tool depicted in FIG. 2 using a fourth embodiment of the animation feature, in accordance with methods and systems consistent with the present invention.

The software development tool may also continue the animation until it detects an error in the source code. In this case, while the automated process is being performed on each of the lines of source code, the software development tool compiles the line of source code, determines whether the compiled line produces an error, and of the compiled line produces the error, the software development tool suspends the automated process. FIG. 29 depicts this embodiment. Initially, the software development tool displays the text of the source code (step 2900). The software development tool simultaneously displays the graphical representation of the source code (step 2902). The software development tool then selects and compiles a line of source code (step 2904). As discussed above, an external tool may also perform the compilation. The software development tool determines whether the compiled line of source code contains an error (step 2906). If an error exists, the process ends. Otherwise, the software development tool displays a graphical representation of the selected line in a visually distinctive manner (step 2908). The software development tool then determines whether there are any more lines of source code (step 2910). If there are more lines, the software development tool compiles the next line of source code at step 2904. Otherwise, if there are no more lines to analyze, the process ends.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A method in a data processing system, wherein the data processing system comprises source code and the source code comprises a plurality of lines, the method comprising the steps of:

displaying simultaneously a graphical and a textual representation of the source code,
wherein the graphical and the textual representations of the source code is generated from a language-neutral representation of the source code that includes a data structure having a source code interface (SCI) model, an SCI package, an SCI class and an SCI member, wherein the language-neutral representation of the source code is stored in a non-repository transient meta model, and
wherein the graphical representation has portions that correspond to the lines;

initiating an automated process that processes each of the lines; and while the automated process processes each of the lines, displaying the portion of the graphical representation that corresponds to the line in a visually distinctive manner such that it visually appears that progression of the automated process is animated.

2. The method of claim 1, further comprising the step of compiling the line before displaying the portion of the graphical representation that corresponds to the line.

3. The method of claim 1, wherein while the automated process processes each of the lines, the method further comprises the step of displaying the line of source code in a visually distinctive manner.

4. The method of claim 1, wherein the graphical representation comprises a class diagram.

5. The method of claim 1, wherein the graphical representation comprises a sequence diagram.

6. The method according to claim 1, wherein the textual representation of the source code is obtained from the source code directly.

7. A method in a data processing system, wherein the data processing system comprises source code and the source code comprises a plurality of lines, the method comprising the steps of:

displaying simultaneously a graphical and a textual representation of the source code, wherein the graphical and the textual representations of the source code are generated from a language-neutral representation of the source code that includes a data structure having a source code interface (SCI) model, an SCI package, an SCI class and an SCI member, wherein the language-neutral representation of the source code is stored in a non-repository transient meta model, and wherein the graphical representation has portions that correspond to the lines; and for each of the lines, displaying the portion of the graphical representation that corresponds to the line in a visually distinctive manner such that it appears that progression through the code is animated.

8. The method of claim 7, further comprising the step of compiling the line before displaying the portion of the graphical representation that corresponds to the line.

9. The method of claim 7, wherein for each of the lines, the method further comprises the step of displaying the line of source code in a visually distinctive manner.

10. The method of claim 7, wherein the graphical representation comprises a class diagram.

11. The method of claim 7, wherein the graphical representation comprises a sequence diagram.

12. The method according to claim 7, wherein the textual representation of the source code is obtained from the source code directly.

13. A method in a data processing system, wherein the data processing system comprises source code and the source code comprises a plurality of lines, wherein a graphical and a textual representation of the source code are displayed simultaneously and generated from a language-neutral representation of the source code that includes a data structure having a source code interface (SCI) model, an SCI package, an SCI class and an SCI member, wherein the language-neutral representation of the source code is stored in a non-repository transient meta model, the method comprising the steps of:

displaying a graphical representation of the plurality of lines such that at least one of the lines is not represented in the graphical representation;

initiating an automated process on each of the lines of the source code;

receiving an indication to suspend the automated process when the automated process encounters one of the lines that is represented in the graphical representation; and while the automated process is being performed on each of the lines of source code, determining whether the line is represented in the graphical representation; and when it is determined that the line is represented in the graphical representation suspending the automated process.

14. The method of claim 13, wherein while the automated process is being performed on each of the lines of source code, the method further comprises the step of displaying the portion of the graphical representation that corresponds to the line in a visually distinctive manner such that it visually appears that progression of the automated process is animated.

15. The method of claim 14, wherein while the automated process is being performed on each of the lines of source code, the method further comprises the step of displaying the line of source code in a visually distinctive manner.

16. The method of claim 13, further comprising the step of compiling the line before determining whether the line is represented in the graphical representation.

17. The method of claim 13, wherein the graphical representation comprises a class diagram.

18. The method of claim 13, wherein the graphical representation comprises a sequence diagram.

19. The method according to claim 13, wherein the textual representation of the source code is obtained from the source code directly.

20. A method in a data processing system, wherein the data processing system comprises source code and the source code comprises a plurality of lines, the method comprising the steps of:

displaying simultaneously a graphical and a textual representation of the source code, wherein the graphical and the textual representations of the source code are generated from a language-neutral representation of the source code that includes a data structure having a source code interface (SCI) model, an SCI package, an SCI class and an SCI member, wherein the language-neutral representation of the source code is stored in a non-repository transient meta model, and initiating an automated process to be performed on each of the lines of the source code; receiving an indication to suspend the automated process when the automated process encounters a selected one of the lines;

while the automated process is being performed on each of the lines of source code, determining whether the line is the selected line; and when it is determined that the line is the selected line, suspending the automated process.

21. The method of claim 20, wherein while the automated process is being performed on each of the lines of source code, the method further comprises the step of displaying the portion of the graphical representation that corresponds to the line in a visually distinctive manner such that it visually appears that progression of the automated process is animated.

22. The method of claim 21, wherein while the automated process is being performed on each of the lines of source code, the method further comprises the step of displaying the line of source code in a visually distinctive manner.

23. The method of claim 20, further comprising the step of compiling the line before determining whether the line is the selected line.

24. The method of claim 20, wherein the graphical representation comprises a class diagram.

25. The method of claim 20, wherein the graphical representation comprises a sequence diagram.

26. The method according to claim 20, wherein the textual representation of the source code is obtained from the source code directly.

27. A method in a data processing system, wherein the data processing system comprises source code and the source code comprises a plurality of lines, the method comprising the steps of:

displaying simultaneously a graphical and a textual representation of the source code;

wherein the graphical and the textual representations of the source code are generated from a language-neutral representation of the source code that includes a data structure having a source code interface (SCI) model, an SCI package, an SCI class and an SCI member, wherein the language-neutral representation of the source code is stored in a non-repository transient meta model;

receiving an indication of a first of the plurality of lines of the source code; selecting a second of the plurality of lines of the source code;

determining whether the second line is the same as the first line; and when it is determined that the second line is not the same as the first line, displaying the graphical representation of the second line in a visually distinctive manner.

28. The method of claim 27, wherein when it is determined that the second line is not the same as the first line, the method further comprises the step of displaying the second line of the source code in a visually distinctive manner.

29. The method of claim 27, wherein when it is determined that the second line is not the same as the first line, the method further comprises the steps of:

selecting a third of the plurality of lines of the source code;

determining whether the third line is the same as the first line; and when it is determined that the third line is not the same as the first line, displaying the graphical representation of the third line in a visually distinctive manner.

30. The method of claim 29, wherein when it is determined that the third line is not the same as the first line, the method further comprises the step of displaying the third line of the source code in a visually distinctive manner.

31. The method of claim 27, wherein the graphical representation comprises a class diagram.

32. The method of claim 27, wherein the graphical representation comprises a sequence diagram.

33. The method according to claim 27, wherein the textual representation of the source code is obtained from the source code directly.

34. A method in a data processing system, wherein the data processing system comprises source code and the source code comprises a plurality of lines, wherein a graphical and a textual representation of the source code are displayed simultaneously and generated from a language-neutral representation of the source code that includes a data structure having source code interface (SCI) model, an SCI package, an SCI class and an SCI member, wherein the language-neutral representation of the source code is stored in a non-repository transient meta model, the method comprising the steps of:

displaying a graphical representation of the plurality of lines such that at least one of the lines is not represented in the graphical representation;

initiating an automated process on each of the lines of the source code;

while the automated process is being performed on each of the lines of source code, compiling the line;

determining whether the compiled line produces an error; and when it is determined that the compiled line produces the error, suspending the automated process.

35. The method of claim 34, wherein while the automated process is being performed on each of the lines of source code, the method further comprises the step of displaying the portion of the graphical representation that corresponds to the line in a visually distinctive manner such that it visually appears that progression of the automated process is animated.

36. The method of claim 35, wherein while the automated process is being performed on each of the lines of source code, the method further comprises the step of displaying the line of source code in a visually distinctive manner.

37. The method of claim 34, wherein the graphical representation comprises a class diagram.

38. The method of claim 34, wherein the graphical representation comprises a sequence diagram.

39. The method according to claim 34, wherein the textual representation of the source code is obtained from the source code directly.

40. A method in a data processing system, wherein the data processing system comprises source code and the source code comprises a plurality of lines, the method comprising the steps of:

displaying simultaneously a graphical and textual representation of the source code, wherein the graphical and textual representations of the source code are generated from a language-neutral representation of the source code that includes a data structure having a source code interface (SCI) model, an SCI package, an SCI class and an SCI member, wherein the language-neutral representation of the source code is stored in a non-repository transient meta model;

selecting one of the plurality of lines of the source code;

compiling the selected line;

determining whether the compiled line produces an error; and when it is determined that the compiled line does not produce an error, displaying the graphical representation of the selected line in a visually distinctive manner.

41. The method of claim 40, wherein when it is determined that the compiled line does not produce an error, the method further comprises the step of displaying the selected line of source code in a visually distinctive manner.

42. The method of claim 40, wherein when it is determined that the compiled line does not produce an error, the method further comprises the steps of:

selecting a second of the plurality of lines of the source code;

compiling the second line;

determining whether the compiled second line produces an error; and when it is determined that the compiled second line does not produce an error, displaying the graphical representation of the second line in a visually distinctive manner.

43. The method of claim 31, wherein when it is determined that the compiled second line does not produce an error, the method further comprises the step of displaying the second line of source code in a visually distinctive manner.

44. The method of claim 40, wherein the graphical representation comprises a class diagram.

45. The method of claim 40, wherein the graphical representation comprises a sequence diagram.

46. The method according to claim 40, wherein the textual representation of the source code is obtained from the source directly.

47. A computer-readable medium containing instructions for controlling a data processing system to perform a method, the data processing system comprises source code and the source code comprises a plurality of lines, the method comprising the steps of:

displaying simultaneously a graphical and a textual representation of the source code, wherein the graphical and textual representations of the source code are generated from a language-neutral representation of the source code that includes a data structure having a source code interface (SCI) model, an SCI package, an SCI class and an SCI member, wherein the language-neutral representation of the source code is stored in a non-repository transient meta model, and wherein the graphical representation has portions that correspond to the lines; initiating an automated process that processes each of the lines; and while the automated process processes each of the lines, displaying the portion of the graphical representation that corresponds to the line in a visually distinctive manner such that it visually appears that progression of the automated process is animated.

48. The computer-readable medium of claim 47, wherein the method further comprises the step of compiling the line before displaying the portion of the graphical representation that corresponds to the line.

49. The computer-readable medium of claim 47, wherein while the automated process processes each of the lines the method further comprises the step of displaying the line of source code in a visually distinctive manner.

50. The computer-readable medium of claim 47, wherein the graphical representation comprises a class diagram.

51. The computer-readable medium of claim 47, wherein the graphical representation comprises a sequence diagram.

52. The computer-readable medium according to claim 47, wherein the textual representation of the source code is obtained from the source directly.

53. A computer-readable medium containing instructions for controlling a data processing system to perform a method, the data processing system comprises source code and the source code comprises a plurality of lines, the method comprising the steps of:

displaying simultaneously a graphical and a textual representation of the source code, wherein the graphical and textual representations of the source code are generated from a language-neutral representation of the source code that includes a data structure having a source code interface (SCI) model, an SCI package, an SCI class and an SCI member, wherein the language-neutral representation of the source code is stored in a non-repository transient meta model, and wherein the graphical representation has portions that correspond to the lines; and for each of the lines, displaying the portion of the graphical representation that corresponds to the line in a visually distinctive manner such that it appears that progression through the code is animated.

54. The computer-readable medium of claim 53, wherein the method further comprises the step of compiling the line before displaying the portion of the graphical representation that corresponds to the line.

55. The computer-readable medium of claim 53, wherein for each of the lines, the method further comprises the step of displaying the line of source code in a visually distinctive manner.

56. The computer-readable medium of claim 53, wherein the graphical representation comprises a class diagram.

57. The computer-readable medium of claim 53, wherein the graphical representation comprises a sequence diagram.

58. The computer-readable medium according to claim 53, wherein the textual representation of the source code is obtained from the source directly.

59. A computer-readable medium containing instructions for controlling a data processing system to perform a method, the data processing system comprises source code and the source code comprises a plurality of lines, wherein a graphical and a textual representations of the source code are displayed simultaneously and generated from a language-neutral representation of the source code that includes a data structure having a source code interface (SCI) model, an SCI package, and SCI class and an SCI member, wherein the language-neutral representation of the source code is stored in a non-repository transient meta model, the method comprising the steps of:

displaying a graphical representation of the plurality of lines such that at least one of the lines is not represented in the graphical representation;

initiating an automated process on each of the lines of the source code; receiving an indication to suspend the automated process when the automated process encounters one of the lines that is represented in the graphical representation; and while the automated process is being performed on each of the lines of source code, determining whether the line is represented in the graphical representation; and when it is determined that the line is represented in the graphical representation, suspending the automated process.

60. The computer-readable medium of claim 59, wherein while the automated process is being performed on each of the lines of source code, the method further comprises the step of displaying the portion of the graphical representation that corresponds to the line in a visually distinctive manner such that it visually appears that progression of the automated process is animated.

61. The computer-readable medium of claim 60, wherein while the automated process is being performed on each of the lines of source code, the method further comprises the step of displaying the line of source code in a visually distinctive manner.

62. The computer-readable medium of claim 59, wherein the method further comprises the step of compiling the line before determining whether the line is represented in the graphical representation.

63. The computer-readable medium of claim 59, wherein the graphical representation comprises a class diagram.

64. The computer-readable medium of claim 59, wherein the graphical representation comprises a sequence diagram.

65. The computer-readable medium according to claim 59, wherein the textual representation of the source code is obtained from the source directly.

66. A computer-readable medium containing instructions for controlling a data processing system to perform a method, the data processing system comprises source code and the source code comprises a plurality of lines, the method comprising the steps of:

displaying simultaneously a graphical and a textual representation of the source code; initiating an automated process to be performed on each of the lines of the source code;

wherein the graphical and textual representations of the source code are generated from a language-neutral representation of the source code that includes a data structure having a source code interface (SCI) model, an SCI package, an SCI class and an SCI member, wherein the language-neutral representation of the source code is stored in a non-repository transient meta-model;

initiating an automated process to be performed on each of the lines of the source code;

receiving an indication to suspend the automated process when the automated process encounters a selected one of the lines; and while the automated process is being performed on each of the lines of source code, determining whether the line is the selected line; and when it is determined that the line is the selected line, suspending the automated process.

67. The computer readable medium of claim 66, wherein while the automated process is being performed on each of the lines of source code, the method further comprises the step of displaying the portion of the graphical representation that corresponds to the line in a visually distinctive manner such that it visually appears that progression of the automated process is animated.

68. The computer-readable medium or claim 67, wherein while the automated process is being performed on each of the lines of source code, the method further comprises the step of displaying the line of source code in a visually distinctive manner.

69. The computer-readable medium of claim 66, wherein the method further comprises the step of compiling the line before determining whether the line is the selected line.

70. The computer-readable medium of claim 66, wherein the graphical representation comprises a class diagram.

71. The computer-readable medium of claim 66, wherein the graphical representation comprises a sequence diagram.

72. The computer-readable medium according to claim 66, wherein the textual representation of the source code is obtained from the source directly.

73. A computer-readable medium containing instructions for controlling a data processing system to perform a method, the data processing system comprises source code and the source code comprises a plurality of lines, the method comprising the steps of:

displaying simultaneously a graphical and a textual representation of the source code;

wherein the graphical and textual representations of the source code are generated from a language-neutral representation of the source code that includes a data structure having a source code interface (SCI) model, an SCI package, an SCI class and an SCI member, wherein the language-neutral representation of the source code is storedin a non-repository transient meta model;

receiving an indication of a first of the plurality of lines of the source code; selecting a second of the plurality of lines of the source code; determining whether the second line is the same as the first line; and when it is determined that the second line is not the same as the first line, displaying the graphical representation of the second line in a visually distinctive manner.

74. The computer-readable medium of claim 73, wherein when it is determined that the second line is not the same as the first line, the method further comprises the step of displaying the second line of the source code in a visually distinctive manner.

75. The computer-readable medium of claim 73, wherein when it is determined that the second line is not the same as the first line, the method further comprises the steps of:

selecting a third of the plurality of lines of the source code;

determining whether the third line is the same as the first line; and when it is determined that the third line is not the same as the first line, displaying the graphical representation of the third line in a visually distinctive manner.

76. The computer-readable medium of claim 75, wherein when it is determined that the third line is not the same as the first line, the method further comprises the step of displaying the third line of the source code in a visually distinctive manner.

77. The computer-readable medium of claim 73, wherein the graphical representation comprises a class diagram.

78. The computer-readable medium of claim 73, wherein the graphical representation comprises a sequence diagram.

79. The computer-readable medium according to claim 73, wherein the textual representation of the source code is obtained from the source directly.

80. A computer-readable medium containing instructions for controlling a data processing system to perform a method, the data processing system comprises source code and the source code comprises a plurality of lines, wherein a graphical and a textual representation of the source code are displayed simultaneously and generated from a language-neutral representation of the source code that includes a data structure having a source code interface (SCI) model, an SCI package, an SCI class and an SCI member, wherein the language-neutral representation of the source code is stored in a non-repository transient meta model, the method comprising the steps of:

displaying a graphical representation of the plurality of lines such that at least one of the lines is not represented in the graphical representation; initiating an automated process on each of the lines of the source code; while the automated process is being performed on each of the lines of source code, compiling the line; determining whether the compiled line produces an error; and when it is determined that the compiled line produces the error, suspending the automated process.

81. The computer-readable medium of claim 80, wherein while the automated process is being performed on each of the lines of source code, the method further comprises the step of displaying the portion of the graphical representation that corresponds to the line in a visually distinctive manner such that it visually appears that progression of the automated process is animated.

82. The computer-readable medium of claim 81, wherein while the automated process is being performed on each of the lines of source code, the method further comprises the step of displaying the line of source code in a visually distinctive manner.

83. The computer-readable medium of claim 80, wherein the graphical representation comprises a class diagram.

84. The computer-readable medium of claim 80, wherein the graphical representation comprises a sequence diagram.

85. The computer-readable medium according to claim 80, wherein the textual representation of the source code is obtained from the source directly.

86. A computer-readable medium containing instructions for controlling a data processing system to perform a method, the data processing system comprises source code and the source code comprises a plurality of lines, the method comprising the steps of:

displaying simultaneously a graphical and a textual representation of the source code;

wherein the graphical and textual representations of the source code are generated from a language-neutral representation of the source code that includes a data structure having a source code interface (SCI) model, an SCI package, an SCI class and an SCI member, wherein the language-neutral representation of the source code is stored in a non-repository transient meta model;

selecting one of the plurality of lines of the source code; compiling the selected line;

determining whether the compiled line produces an error; and when it is determined that the compiled line does not produce an error, displaying the graphical representation of the selected line in a visually distinctive manner.

87. The computer-readable medium of claim 86, wherein when it is determined that the compiled line does not produce an error, the method further comprises the step of displaying the selected line of source code in a visually distinctive manner.

88. The computer-readable medium of claim 86, wherein when it is determined that the compiled line does not produce an error, the method further comprises the steps of:
  selecting a second of the plurality of lines of the source code;
  compiling the second line;
  determining whether the compiled second line produces an error; and
  when it is determined that the compiled second line does not produce an error,
    displaying the graphical representation of the second line in a visually distinctive manner.

89. The computer-readable medium of claim 88, wherein when it is determined that the compiled second line does not produce an error, the method further comprises the step of displaying the second line of source code in a visually distinctive manner.

90. The computer-readable medium of claim 86, wherein the graphical representation comprises a class diagram.

91. The computer-readable medium of claim 86, wherein the graphical representation comprises a sequence diagram.

92. The computer-readable medium according to claim 86, wherein the textual representation of the source code is obtained from the source directly.

93. A data processing system comprising:
  a secondary storage device further comprising source code wherein the source code comprises a plurality of lines;
  a memory device further comprising a program that displays simultaneously a graphical and a textual representation of the plurality of lines,
    wherein the graphical and textual representations of the source code are generated from a language-neutral representation of the source code that includes a data structure having a source code interface (SCI) model, an SCI neutral representation of the source code is stored in a non-repository transient meta model,
  such that at least one of the lines is not represented in the graphical representation,
  that initiates an automated process on each of the lines of the source code,
  that receives an indication to suspend the automated process when the automated process encounters one of the lines that is represented in the graphical representation,
  that determines whether the line is represented in the graphical representation while the automated process is being performed on each of the lines of source code, and
  that suspends the automated process when it is determined that the line is represented in the graphical representation, and
  a processor for running the program.

94. The data processing system of claim 93, wherein while the automated process is being performed on each of the lines of source code, the program further displays the portion of the graphical representation that corresponds to the line in a visually distinctive manner such that it visually appears that progression of the automated process is animated.

95. The data processing system of claim 94, wherein while the automated process is being performed on each of the lines of source code, the program further displays the line of source code in a visually distinctive manner.

96. The data processing system of claim 93, wherein the program further compiles the line before determining whether the line is represented in the graphical representation.

97. The data processing system of claim 93, wherein the graphical representation comprises a class diagram.

98. The data processing system of claim 93, wherein the graphical representation comprises a sequence diagram.

99. The computer-readable medium according to claim 93, wherein the textual representation of the source code is obtained from the source directly.

100. A data processing system comprising:
  a secondary, storage device further comprising source code wherein the source code comprises a plurality of lines;
  a memory device further comprising a program that displays simultaneously a graphical and a textual representation of the source code,
    wherein the graphical and textual representations of the source code are generated from a language-neutral representation of the source code that includes a data structure having a source code interface (SCI) model, an SCI package, an SCI class and an SCI member, wherein the language-representation of the source code is stored in a non-repository transient meta model,
  that initiates an automated process to be performed on each of the lines of the source code,
  that receives an indication to suspend the automated process when the automated process encounters a selected one of the lines, and that determines whether the line is the selected line while the automated process is being performed on each of the lines of source code and that suspends the automated process when it is determined that the line is the selected line; and
  a processor for running the program.

101. The data processing system of claim 100, wherein while the automated process is being performed on each of the lines of source code, the program further displays the portion of the graphical representation that corresponds to the line in a visually distinctive manner such that it visually appears that progression of the automated process is animated.

102. The data processing system of claim 101, wherein while the automated process is being performed on each of the lines of source code, the program further displays the line of source code in a visually distinctive manner.

103. The data processing system of claim 100, wherein the program further compiles the line before determining whether the line is the selected line.

104. The data processing system of claim 100, wherein the graphical representation comprises a class diagram.

105. The data processing system of claim 100, wherein the graphical representation comprises a sequence diagram.

106. The computer-readable medium according to claim 100, wherein the textual representation of the source code is obtained from the source directly.

107. A data processing system comprising:
a secondary storage device further comprising source code wherein the source code comprises a plurality of lines;
a memory device further comprising a program
that displays simultaneously a graphical and a textual representation of the source code,
wherein the graphical and textual representation of the source code are generated from a language-neutral representation of the sources that includes a data structure having a source code interface (SCI) model, an SCI package, an SCI class and an SCI member, wherein the language-neutral representation at the source code is stored in a non-repository transient meta model,
that receives an indication of a first of the plurality at lines of the source code, that selects a second of the plurality of lines of the source code, that determines whether the second line is the same as the first line, and that displays the graphical representation of the second line in a visually distinctive manner when it is determined that the second line is not the same as the first line; and
a processor for running the program.

108. The data processing system of claim 107, wherein when it is determined that the second line is not the same as the first line, the program further displays the second line of the source code in a visually distinctive manner.

109. The data processing system of claim 107, wherein when it is determined that the second line is not the same as the first line, the program further selects a third of the plurality of lines of the source code, determines whether the third line is the same as the first line, and when it is determined that the third line is not the same as the first line, the program displays the graphical representation of the third line in a visually distinctive manner.

110. The data processing system of claim 109, wherein when it is determined that the third line is not the same as the first line, the program further displays the third line of the source code in a visually distinctive manner.

111. The data processing system of claim 107, wherein the graphical representation comprises a class diagram.

112. The data processing system of claim 107, wherein the graphical representation comprises a sequence diagram.

113. The computer-readable medium according to claim 107, wherein the textual representation of the source code in obtained from the source directly.

114. A data processing system comprising;
a secondary storage device further comprising source code wherein the source code comprises a plurality of lines;
a memory device further comprising a program that displays simultaneously a graphical and a textual representation of the plurality of lines,
wherein the graphical and textual representations of the source code are generated from a language neutral representation of the source code that includes a data structure having a source code interface (SCI) model, an SCI package, an SCI class and an SCI member, wherein the language-neutral representation of the source code is stored in a non-repository transient meta model,
such that at least one of the lines is not represented in the graphical representation,
that initiates an automated process on each of the lines of the source code,
that while the automated process is being performed on each of the lines of source code, the program compiles the line, determines whether the compiled line produces an error, and when it is determined that the compiled line produces the error, the program suspends the automated process; and
a processor for running the program.

115. The data processing system of claim 114, wherein while the automated process is being performed on each of the lines of source code, the program further displays the portion of the graphical representation that corresponds to the line in a visually distinctive manner such that it visually appears that progression of the automated process is animated.

116. The data processing system of claim 115, wherein while the automated process is being performed on each of the lines of source code, the program further displays the line of source code in a visually distinctive manner.

117. The data processing system of claim 114, wherein the graphical representation comprises a class diagram.

118. The data processing system of claim 114, wherein the graphical representation comprises a sequence diagram.

119. The computer-readable medium according to claim 114, wherein the textual representation of the source code is obtained from the source directly.

120. A data processing system comprising:
a secondary storage device further comprising source code wherein the source code comprises a plurality of lines;
a memory device further comprising a program that displays simultaneously a graphical and a textual representation of the source code,
wherein the graphical and textual representations of the source code are generated from a language-neutral representation of the source code that includes a data structure having a source code interface (SCI) model, an SCI package, an SCI class and an SCI member, wherein the language-neutral representation of the source code is stored in a non-repository transient meta model, that selects one of the plurality of lines of the source code, that compiles the selected line, that determines whether the compiled line produces an error, and that displays the graphical representation of the selected line in a visually distinctive manner when it is determined that the compiled line does not produce an error, and
a processor far running the program.

121. The data processing system of claim 120, wherein when it is determined that the compiled line does not produce an error, the program further displays the selected line of source code in a visually distinctive manner.

122. The data processing system of claim 120, wherein when it is determined that the compiled line does not produce an error, the program further selects a second of the plurality of lines of the source code, compiles the second line, determines whether the compiled second line produces an error, and when it is determined that the compiled second line does not produce an error, the program displays the graphical representation of the second line in a visually distinctive manner.

123. The data processing system of claim 122, wherein when it is determined that the compiled second line does not produce an error, the program further displays the second line of source code in a visually distinctive manner.

124. The data processing system of claim 120, wherein the graphical representation comprises a class diagram.

125. The data processing system of claim 120, wherein the graphical representation comprises a sequence diagram.

126. The computer-readable medium according to claim 120, wherein the textual representation of the source code is obtained from the source directly.

127. A system having source code wherein the source code comprises a plurality of lines, the system comprising;
- means for displaying simultaneously a graphical and a textual representation of the source code,
  - wherein the graphical and textual representations of the source code are generated from a language-neutral representation of the source code that includes a data structure having a source code interface (SCI) model, an SCI package, an SCI class and an SCI member, wherein the language-neutral representation of the source code is stored in a non-repository transient meta model, and
  - wherein the graphical representation has portions that correspond to the lines;
- means for initiating an automated process that processes each of the lines; and
- means for displaying the portion of the graphical representation that corresponds to the line in a visually distinctive manner such that it visually appears that progression of the automated process is animated while the automated process processes each of the lines.

128. The computer-readable medium according to claim 127, wherein the textual representation of the source code is obtained from the source directly.

* * * * *

UNITED STATES PATENT AND TRADEMARK OFFICE
CERTIFICATE OF CORRECTION

PATENT NO. : 7,055,131 B2 Page 1 of 1
APPLICATION NO. : 09/829527
DATED : May 30, 2006
INVENTOR(S) : Dietrich Charisius and Peter Coad It is certified that error appears in the above-identified patent and that said Letters Patent is hereby corrected as shown below:

Column 23, Line 65, after the word "and", "of" should be --if--

Column 31, Line 41, "storedin" should be --stored in--

Column 33, Line 46, after the word "model" the text should read --and SCI package, an SCI class and an SCI member, wherein the language-neutral--

Column 34, Line 33, after the word "language", insert -- -neutral--

Column 35, Line 10, "sources" should be --source--

Column 35, Line 13, the word "at" should be --"of--

Title page, under [56] Other Publications insert
--Object Oriented Software Engineering, A Use Case Driven Approach 1996
Jacobson, Ivar Part I Chapters 1-5, Part II Chapters6-12, Part III Chapters 13-16, pages 1-500--

Signed and Sealed this

Twenty-eighth Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 7,055,131 B2  
APPLICATION NO. : 09/839527  
DATED : May 30, 2006  
INVENTOR(S) : Dietrich Charisius and Peter Coad It is certified that error appears in the above-identified patent and that said Letters Patent is hereby corrected as shown below:

Column 23, Line 65, after the word "and", "of" should be --if--

Column 31, Line 41, "storedin" should be --stored in--

Column 33, Line 46, after the word "model" the text should read --and SCI package, an SCI class and an SCI member, wherein the language-neutral--

Column 34, Line 33, after the word "language", insert -- -neutral--

Column 35, Line 10, "sources" should be --source--

Column 35, Line 13, the word "at" should be --"of--

Title page, under [56] Other Publications insert  
--Object Oriented Software Engineering, A Use Case Driven Approach 1996 Jacobson, Ivar Part I Chapters 1-5, Part II Chapters6-12, Part III Chapters 13-16, pages 1-500--

This certificate supersedes Certificate of Correction issued November 28, 2006.

Signed and Sealed this

Second Day of January, 2007

JON W. DUDAS  
*Director of the United States Patent and Trademark Office*